US007003161B2

(12) United States Patent
Tessadro

(10) Patent No.: US 7,003,161 B2
(45) Date of Patent: Feb. 21, 2006

(54) SYSTEMS AND METHODS FOR BOUNDARY DETECTION IN IMAGES

(75) Inventor: Ana M. Tessadro, Seattle, WA (US)

(73) Assignee: Mitutoyo Corporation, Kawasaki (JP)

(*) Notice: Subject to any disclaimer, the term of this patent is extended or adjusted under 35 U.S.C. 154(b) by 629 days.

(21) Appl. No.: 09/987,986

(22) Filed: Nov. 16, 2001

(65) Prior Publication Data

US 2003/0095710 A1 May 22, 2003

(51) Int. Cl.
*G06K 9/48* (2006.01)

(52) U.S. Cl. .................................................... 382/199

(58) Field of Classification Search ................ 382/103, 382/141, 148, 151, 152, 173, 181, 190, 195, 382/1, 199, 203, 206, 224, 261, 266

See application file for complete search history.

(56) References Cited

U.S. PATENT DOCUMENTS

| | | | | | |
|---|---|---|---|---|---|
| 4,910,786 | A | * | 3/1990 | Eichel | 382/199 |
| 5,115,476 | A | * | 5/1992 | Ito | 382/199 |
| 5,212,740 | A | | 5/1993 | Paek et al. | 382/266 |
| 5,392,137 | A | * | 2/1995 | Okubo | 358/462 |
| 5,561,724 | A | | 10/1996 | Kido et al. | |
| 5,563,962 | A | | 10/1996 | Peters et al. | |
| 5,671,294 | A | | 9/1997 | Rogers et al. | |
| 5,692,072 | A | * | 11/1997 | Hashimoto | 382/199 |
| 5,881,171 | A | | 3/1999 | Kinjo | |
| 6,078,680 | A | * | 6/2000 | Yoshida et al. | 382/128 |
| 6,111,983 | A | | 8/2000 | Fenster et al. | |
| 6,137,893 | A | * | 10/2000 | Michael et al. | 382/103 |
| 6,141,033 | A | | 10/2000 | Michael et al. | 348/25 |
| 6,178,260 | B1 | | 1/2001 | Li et al. | 382/173 |
| 6,192,150 | B1 | | 2/2001 | Leow et al. | 382/190 |
| 6,233,060 | B1 | * | 5/2001 | Shu et al. | 358/1.9 |
| 6,259,823 | B1 | * | 7/2001 | Lee et al. | 382/268 |
| 6,701,005 | B1 | * | 3/2004 | Nichani | 382/154 |

OTHER PUBLICATIONS

Will, et al. "On learning texture edge detectors", IEEE, pp. 877-880, Jul. 2000.*

Zhu, et al. "Region competition: unifying snakes, region growing, and Bayes/MDL for multiband image segmentation", IEEE, pp 884-900, 1996.*

S. Akoy, R. Haralick, "Feature Normalization and Likelihood-based Similarity Measures for Image Retrieval", 2000.

J. Bexdek et al., "FCM: The Fuzzy c-Means Clustering Algorithm", Computers and Geosciences, vol. 10, NRO 2-3, pp 191-203.

(Continued)

*Primary Examiner*—Daniel Miriam
(74) *Attorney, Agent, or Firm*—Oliff & Berridge, PLC

(57) ABSTRACT

Systems and methods that accurately detect and locate an edge or boundary position based on a number of different characteristics of the image, such as texture, intensity, color, etc. A user can invoke a boundary detection tool to perform, for example, a texture-based edge-finding operation, possibly along with a conventional intensity gradient edge-locating operation. The boundary detection tool defines a primary region of interest that will include an edge or boundary to be located within a captured image of an object. The boundary detection tool is useable to locate edges in a current object, and to quickly and robustly locate corresponding edges of similar objects in the future.

41 Claims, 16 Drawing Sheets

OTHER PUBLICATIONS

F. Farrokhnia, A. Jain, "A multi-Channel Filtering Approach to Texture Segmentation", 1991 IEEE Computer Society Conference on Comp. Vision and Pattern Recognition, Hawaii, Jun. 3-6, 1991.

K. Fukunaga, "Introduction to Statistical Pattern Recognition", Academic Press, 1990.

A.K. Jain and F. Farrokhnia, Unsupervised Texture Segmentation Using Gabor Filters:, Pattern Recognition, vol. 24, NRO 12, pp 1167-1186, 1991.

Kenneth I. Laws, "Rapid Texture Identification", Image Processing for Missile Guidance, vol. 238, pp 376-380, 1980.

Trygve Randen and John H. Husoy, "Filtering for Texture Classification: A Comparative Study", IEEE Transactions on Pattern Analysis and Machine Intelligence, vol. 21, NO. 4, Apr. 1999.

* cited by examiner

SYSTEMS AND METHODS FOR BOUNDARY DETECTION IN IMAGES

BACKGROUND OF THE INVENTION

1. Field of Invention

This invention relates to boundary detection and boundary location determination between two regions in images.

2. Description of Related Art

Many conventional machine visions systems used in locating the edges of features in images are based primarily or exclusively on applying gradient operations to the intensity values of the original image pixels. In applying gradient operations, these systems perform edge-location using the contrast inherent in the original intensity of an image. This operation is often used for machine visions systems that emphasize determining the location of edges in images of man-made work pieces with a high degree of precision and reliability. In these cases, the geometry of the edges is often well-behaved and predictable, thus providing constraints that can be applied to the edge location operations so that good results may be obtained for the majority of these images. It is also well known to use filters prior to edge detection operations to improve the reliability of the intensity gradient-type operations in finding points along an edge, and to exclude outliers from the located edges points after edge detection to further increase the reliability of the detected edge location.

There are several conventional vision machines that use these methods. These vision machines also typically include software that provides one or more "edge tools." The edge tools are special cursors and/or graphical user interface (GUI) elements that allow an operator of a machine vision system to more easily input useful information and/or constraints used with the underlying edge-location method.

However, as is well known in the field of image processing, these conventional methods can become unreliable when the image regions near edges exhibit a high degree of texture or when the edge is defined by a change in texture, color, or other image characteristics that do not always correspond to well-behaved intensity gradients in the image. The images associated with textured edges are inherently irregular or noisy because each texture region near a particular edge is imaged as a high spatial frequency intensity variation near the edge. Thus, the intensity gradient-type operations previously discussed tend to return noisy results, which subsequently result in poor detection of the edge locations. Although filtering operations can be used to reduce the noise in these situations, the filtering operations can also unintentionally further disturb the image in a way that distorts the detected edge location. Furthermore, in some cases, for example when the average intensities in the texture regions bordering the edge are approximately the same, intensity gradient operations become completely unreliable for finding the location of the edges. Thus, in such situations, the conventional methods cannot precisely detect an edge location of an image because there is no significant intensity gradient or differential that can be clearly detected.

In images containing multiple distinct objects or regions having various textures, a wide variety of texture-based image-segmentation methods are known. For example, one method can group or classify image pixels into local regions based on the values of particular texture metrics. Such methods define a border which separates the pixels grouped or classified in one region from the pixels grouped or classified in the other region, as a by-product of classification process. However, such methods are typically designed and applied for object recognition, object tracking and the like.

A common problem associated with these existing image segmentation systems is the rigidity of the system structure. Systems which include a great variety of texture filters for robustness are too slow to support high-speed industrial throughput requirements. Systems which limit the number of texture filters and or use a limited number of predetermined parameters usable as thresholds in detecting region membership are often unreliable when applied to a wide variety of textures. Thus, such existing segmentation systems are insufficiently versatile, robust and/or fast for use in a general-purpose commercial machine vision system.

Furthermore, such segmentation methods have not been well-developed for finding relatively precise positions for edge locations at the boundaries between regions. It is generally recognized that accurate edge/boundary preservation is a goal that conflicts to some extent with operations, such as energy estimation, which are essential for accurate pixel grouping or classification. For example, U.S. Pat. No. 6,178,260 to Li et al. discloses a method used for character recognition, where a local roughness and a peak-valley count is determined for a window and/or subwindow of an image. The input image data for the window is subsequently classified based on the local roughness and the peak-valley count. This method may be complemented by using a pattern-detecting edge class that tries to identify line art or kanji regions that could otherwise be missed by the roughness and peak-valley classification. This image segmentation method is more robust than many previous methods, and adapts to a current image. However, this method does not disclose any specific methods or tools of particular use for locating the position of a boundary between the classification regions with robustness and precision.

U.S. Pat. No. 6,111,983 to Fenster et al. discloses a method used for shape recognition that can be used with medical images. In this method, a shape model is "trained" for parameter settings in an objective function, based on training data for which the correct shape is specified. This training can be advantageously applied to models in which a shape or a boundary is treated in a sectored fashion, with training individually applied to each sector. The sectors may be characterized by a variety or combination of features, and the features are adjusted to generate a desirable sector dependent objective function. This method is more robust than many previous methods, and adapts to a current image. However, the method does not disclose any specific methods or tools for locating the position of a boundary between various sectors with robustness and precision.

For application to general purpose commercial machine vision systems, it is also highly desirable or necessary that the various image processing methods incorporated into the system can be set up and operated for particular images by relatively unskilled users, that is, users who are not skilled in the field of image processing. Thus, it is a particular problem to create a machine vision system which locates textured edges in a versatile, robust, fast and relatively precise way, while at the same time adapting and governing that machine vision system edge detection process through the use of a simple user interface that is operable by a relatively unskilled operator.

SUMMARY OF THE INVENTION

Accordingly, texture-based segmentation methods and image-specific texture-based segmentation methods have not been well-developed for finding relatively precise positions for edge locations at the boundaries between regions. Furthermore, such methods have not been combined with a method that automatically streamlines them and subordinates them to other edge or boundary detection operations according to the reasonably well-behaved and predictable characteristics of particular edges found on industrial inspection objects. Moreover, these methods have not been supported by a simple user interface or compatible "edge tools" which can be used by operators having little or no understanding of the underlying mathematical or image processing operations.

Finally, no conventional machine vision system user interface supports both the operation of conventional intensity gradient-type edge locating operations and texture-type edge-locating operations with substantially similar edge-tools and/or related GUIs, or combines both types of operations for use with a single edge tool.

Accordingly, because many operators of conventional machine vision systems desire a more standardized edge locating capability which supports increasingly robust operations with minimal user understanding and/or intervention, there is a need for systems and methods that can be used with existing machine vision systems that can precisely detect the position of a boundary, i.e., an edge, between regions using image characteristics other than intensity gradients or differentials so that images of edges that are not well-defined by changes in intensity can be more accurately detected and located.

This invention provides systems and methods that accurately locate an edge position based on a number of different characteristics of the image.

This invention separately provides systems and methods that accurately locate an edge position bounded or defined by one or two significantly textured regions as an easily integrated supplement and/or alternative to intensity-gradient type edge locating operations.

This invention separately provides systems and methods that accurately locate an edge position bounded by one or two significantly colored regions or color-textured regions as an easily integrated supplement and/or alternative to intensity-gradient type edge locating operations.

This invention separately provides systems and methods where the decisions and operations associated with locating an edge position can be performed manually with the aid of the GUI, semi-automatically or automatically.

This invention separately provides systems and methods that accurately locate an edge position bounded by one or two highly textured regions using adaptively-selected texture filters and/or texture features.

This invention separately provides systems and methods that define a plurality of specific training regions-of-interest in the vicinity of an edge-location operation, where the specific training regions are used to determine a texture-discriminating filter and/or feature set which best supports edge-location operations at an edge or boundary between the training regions.

This invention separately provides systems and methods that determine a customized case-specific edge-finding routine that operates with particular speed and reliability when finding similar case-specific edges in images of similar imaged parts.

This invention separately provides systems and methods where certain decisions and operations associated with the determination of a customized case-specific edge-finding routine can be performed manually with the aid of the GUI, semi-automatically or automatically.

In various exemplary embodiments of the systems and methods according to this invention, a user can invoke a boundary detection tool, alternatively called an edge tool, to perform a texture-based edge-finding operation, possibly along with a conventional intensity gradient edge-locating operation, to define a primary area of interest that will include an edge to be located within a captured image of an object. The boundary detection tool in accordance with the systems and methods according to this invention is useable to locate edges in a current object, and to locate corresponding edges of similar objects in the future.

A boundary detection tool in accordance with the systems and methods according to this invention optionally allows a user to specify the shape, the location, the orientation, the size and/or the separation of two or more pairs of sub-regions-of-interest bounding the edge to be located. Alternatively, the machine vision systems and methods according to this invention can operate automatically to determine the sub-regions-of-interest. If conventional intensity gradient-based edge-locating operations are not appropriate for locating the edge included in the primary region-of-interest, then the sub-regions-of-interest are used as training regions to determine a set of texture-based features which can be used to effectively separate the feature values of pixels on either side of the included edge into two distinct classes or clusters. A pseudo-image, such as a membership image, is calculated using the feature images. Gradient operations can then be applied to the membership image to detect the desired edge and determine its location. Post-processing can be applied to the edge data, using input data related to known features and approximate locations of the edge, to remove outliers and otherwise improve the reliability of the edge location. These and other features and advantages of the this invention allow relatively unskilled users to operate a general-purpose machine vision system in a manner that precisely and repeatably locates edges in a variety of situations where conventional intensity gradient methods locate edges unreliably or fail to locate the edges altogether.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

The systems and methods of this invention can be used in conjunction with the machine vision systems and/or the lighting calibration systems and methods disclosed in U.S. Pat. No. 6,239,554 B1, which is incorporated herein by reference in its entirety.

With regard to the terms "boundaries" and "edges" as used herein, the terms "boundaries" and "edges" are generally used interchangeably with respect to the scope and operations of the systems and methods of this invention. However, when the context clearly dictates, the term "edge" may further imply the edge at a discontinuity between different surface planes on an object and/or the image of that object. Similarly, the term "boundary" may further imply the boundary at a discontinuity between two textures, two colors, or two other relatively homogeneous surface properties, on a relatively planar surface of an object, and/or the image of that object.

Figure 1:
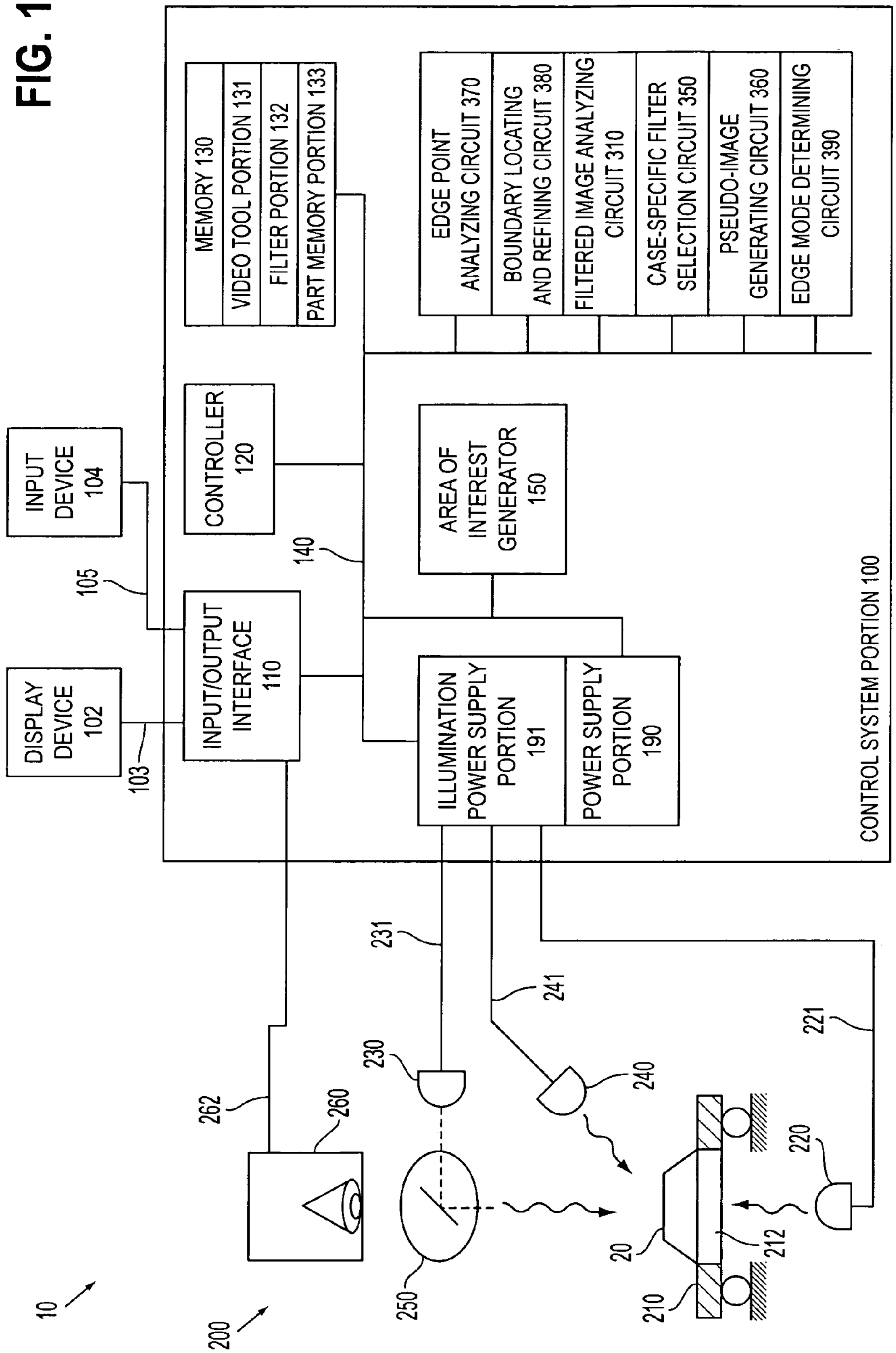
FIG. 1 is an exemplary block diagram of a vision system usable with the edge detection systems and methods according to this invention.

For simplicity and clarification, the operating principles and design factors of this invention are explained with reference to one exemplary embodiment of a vision system according to this invention, as shown in FIG. 1. The basic explanation of the operation of the vision system shown in FIG. 1 is applicable for the understanding and design of any vision system that incorporates the boundary detection systems and methods according to this invention.

FIG. 1 shows one exemplary embodiment of a vision system 10 incorporating one exemplary embodiment of the boundary detection systems and methods according to this invention. As shown in FIG. 1, the vision system 10 includes a control portion 100 and a vision system components portion 200. The vision system components portion 200 includes a stage 210 having a central transparent portion 212. An object 20 to be imaged using the vision system 10 is placed on the stage 210. Light emitted by one or more of the light sources 220–240 illuminates the object 20. The light from the one or more light sources 220–240 passes through a lens system 250 after illuminating the part 20, and possibly before illuminating the object 20, and is gathered by a camera system 260 to generate an image of the object 20. The image of the part 20 captured by the camera system 260 is output on a signal line 262 to the control portion 100. The light sources 220–240 used to illuminate the object 20 include a stage light 220, a coaxial light 230, and a surface light 240, such as a ring light or a programmable ring light, all connected to the control portion 100 through connecting lines or buses 221, 231 and 241, respectively.

The distance between the stage 210 and the camera system 260 can be adjusted to change the focus of the image of the object 20 captured by the camera system 260. In particular, in various exemplary embodiments of the vision system 10, the position of the camera system 260 along a vertical axis is changeable relative to a fixed stage 210. In other various exemplary embodiments of the vision system 10, the position of the stage 210 along the vertical axis can be changed relative to a fixed camera system 260. In further various exemplary embodiments of the vision system 10, the vertical positions of both the camera system 260 and the stage 210 can be altered to maximize the focus range of the vision system 10.

As shown in FIG. 1, one exemplary embodiment of the control portion 100 includes an input/output interface 110, a controller 120, a memory 130, an area of interest generator 150, and a power supply 190 including an illumination power supply portion 191, each interconnected either by a data/control bus 140 or by direct connections between the various elements. The memory 130 includes a video tool memory portion 131, a filter memory portion 132, and a part program memory portion 133, each also interconnected by the data/control bus 140 or by direct connections. The connecting lines or buses 221, 231 and 241 of the stage light 220, the coaxial light 230, and the surface light 240, respectively, are all connected to the illumination power supply portion 191. The signal line 262 from the camera system 260 is connected to the input/output interface 110. Also, a display 102 can be connected to the input/output interface 110 over a signal line 103. One or more input devices 104 can be connected over one or more signal lines 105. The display 102 and the one or more input devices 104 can be used to view, create and/or modify part programs, to view the images captured by the camera system 260 and/or to directly control the vision system components 200. However, it should be appreciated that, in a fully automated system having a predefined part program, the display 102 and/or the one or more input devices 104, and the corresponding signal lines 103 and/or 105, may be omitted.

As shown in FIG. 1, the vision system 10 also includes a filtered image analyzing circuit or routine 310, a case-specific filter selection circuit or routine 350, a pseudo-image generating circuit or routine 360, an edge point analyzing circuit or routine 370, a boundary locating and refining circuit or routine 380, and an optional edge mode determining circuit or routine 390, each also interconnected by the data/control bus 140 or by direct connections.

The memory portion 130 stores data usable to operate the vision system components 200 to capture an image of the object 20 such that the input image of the object 20 has desired image characteristics. The memory portion 130 further stores data usable to operate the vision system to perform various inspection and measurement operations on the captured images, manually or automatically, and to output the results through the input/output interface 110. The memory 130 also contains data defining a graphical user interface operable through the input/output interface 110.

The video tool memory portion 131 includes data defining various video tools usable with the graphical user interface, and in particular, one or more edge or boundary tools usable with the area of interest generator 150 to define and store in memory data associated with an edge locating operation in an area of interest within the captured image. An exemplary edge/boundary detection tool and the associated data are described in greater detail below with reference to FIGS. 3 and 4. The filter memory portion 132 includes data defining various image filtering operations usable with the systems and methods according to this invention, as described in detail further below. The part program memory portion 133 includes data defining various operations usable to create and store a sequence of operations or routines for subsequent automatic operation of the vision system 10.

The filtered image analyzing circuit or routine 310 applies various candidate filters to modify and/or analyze a textured input image in a current area of interest, and determines filtered image results based on the modifications and/or analysis. The filtered image results are usable to determine which of the candidate filters best emphasize or isolate the location of an edge in the area of interest. The case-specific filter selection circuit or routine 350 selects the case-specific filters that best emphasize or isolate the location of the edge in the area of interest, based on the various filtered image results. The case-specific filter selection circuit or routine 350 may also record the case-specific filter selection in one or more portions of the memory 130.

The pseudo-image generating circuit or routine 360 generates a pseudo-image in the area of interest based on the selected case-specific filters. The pseudo-image emphasizes or isolates the location of the edge relative to the obscured characteristics of the textured edge in the input image. The edge point analyzing circuit or routine 370 is then applied to the pseudo-image in the area of interest, to estimate one or more edge points in the pseudo-image. The edge point analyzing circuit or routine 370 may also perform operations to refine an initial edge point estimate, based on additional information. The edge point analyzing circuit or routine 370 may also record one or more edge detection parameters associated with the estimated edge points in one or more portions of the memory 130.

The boundary locating and refining circuit or routine 380 analyzes a plurality of estimated edge points to determine if they correspond to criteria for a reliable edge. The boundary locating and refining circuit or routine 380 also governs the refinement or elimination of spurious edge points and finally determines overall edge location data based on reliable edge points. The boundary locating and refining circuit or routine 380 may also record the edge location data in one or more portions of the memory 130 or output it through the input/output interface 110.

The edge mode determining circuit or routine 390 can be an optional element of the control system portion 100. It should be appreciated that the control system portion 100 also includes known circuits or routines to perform known edge detection operations on input images acquired by the vision system 100. Such known edge-detection known circuits or routines may be included in the edge point analyzing circuit or routine 370 and/or the boundary locating and refining circuit or routine 380, for example. Depending on the scope of operation of various elements such as the edge tools in the video memory portion 131, the area of interest generator 150, the edge point analyzing circuit or routine 370 and the boundary locating and refining circuit or routine 380, such elements may operate to independently determine whether a given area of interest is appropriately analyzed by an edge detection applied to the input image or an edge detection applied to a pseudo-image. However, when such elements cannot independently determine whether a given area of interest is appropriately analyzed by edge detection applied to the input image or edge detection applied to a pseudo-image, the edge mode determining circuit or routine 390 can be included to determine the appropriate mode of operation for the various other elements performing the edge detection operations.

Figure 2:
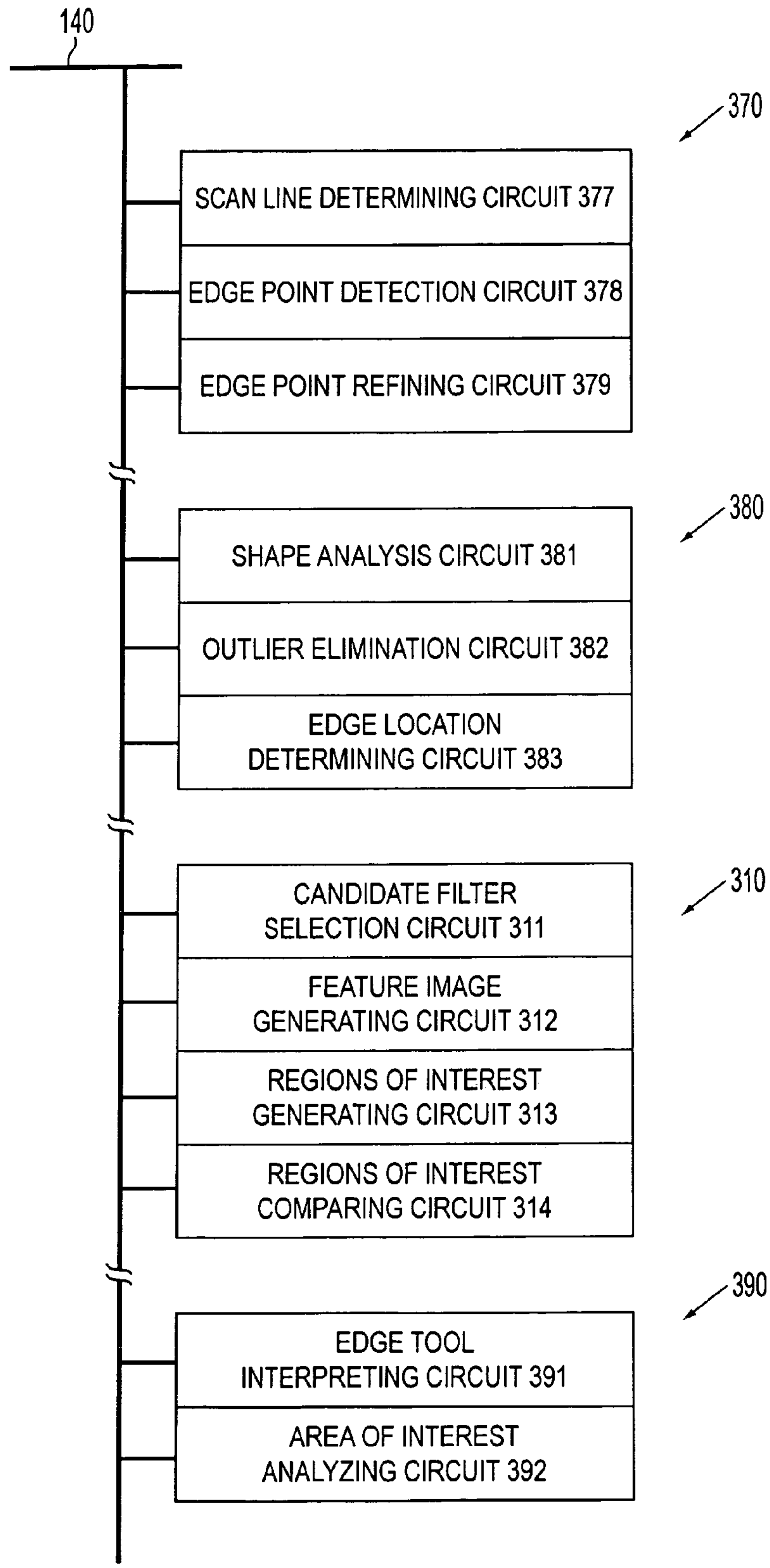
FIG. 2 illustrates a detailed exemplary embodiment of the various circuits or routines of FIG. 1 usable with the edge detection systems and methods according to this invention.

FIG. 2 illustrates a detailed exemplary embodiment of various circuits or routines of the vision system 10 described above with respect to FIG. 1. As shown in FIG. 2, the filtered image analyzing circuit or routine 310 includes a candidate filter selection circuit or routine 311, a feature image generating circuit or routine 312, a regions-of-interest generating circuit or routine 313, and a regions-of-interest comparing circuit or routine 314, each interconnected by the data/control bus 140 or by direct connections. The edge point analyzing circuit or routine 370 includes a scan line determining circuit or routine 377, a edge point detection circuit or routine 378, and an edge point refining circuit or routine 379, each also interconnected by the data/control bus 140 or by direct connections. The boundary locating and refining circuit or routine 380 includes a shape analysis circuit or routine 381, an outlier elimination circuit 382, and a location determining circuit 383, each also interconnected by the data/control bus 140 or by direct connections. The edge mode determining circuit or routine 390 includes an edge tool interpreting circuit or routine 391 and an area of interest analyzing circuit or routine 392, each also interconnected by the data/control bus 140 or by direct connections.

In various exemplary embodiments of the filtered image analyzing circuit or routine 310, the elements 311–314 operate as follows:

The candidate filter selection circuit or routine 311 selects the set of candidate filters that will be applied to the input image to obtain feature images or the like corresponding to the candidate filters. The candidate filters are selected from the set of filters included in the filter memory portion 132, which in one exemplary embodiment includes one or more predetermined groups of candidate filters. Each such group includes filters that are associated with enhancing edge detection and location for images that exhibit a particular set of characteristics around their edges to be detected. The candidate filter selection circuit or routine 311 selects particular candidate filters depending on the characteristics of the input image. Such characteristics may include, for example, whether there is significant texture on one or both sides of the edge to be detected, whether the image is a gray level image or a color image, and the like, as described further below. For various images, the candidate filter selection circuit or routine 311 may select all the filters in the filter memory portion 132. In various exemplary embodiments, the candidate filter selection circuit or routine 311 automatically selects the candidate filters and in other exemplary embodiments the selection is based on user input.

In various exemplary embodiments, the predetermined subsets of candidate filters selectable by the candidate filter selection circuit or routine 311 include: a subset including filters that establish one or more a feature images based on the gradient of a Sobel operator, a subset including filters that establish one or more feature images based on Law's filters, i.e., a set of 25 filters incorporating 5×5 (or optionally, 3×3) pixel masks or windows, and a subset including filters that establish one or more feature images based on Gabor's filters. The inventor has used the Sobel gradient filter with success when the edge to be detected includes significant texture on one side of the edge and insignificant texture on the other side of the edge. The inventor has used Law's filters with success when the edge to be detected includes significant and fine textures on both sides of the edge. The inventor has used Gabor's filters with success when the edge to be detected includes significant and fine textures and/or directional features on both sides of the edge. Also, to detect the boundary between color regions in color images the inventor has used moving average filters with success.

These various filter subsets tend to operate with respective short, medium and longer execution times. Thus, they are conveniently selected to match the appropriate texture conditions in a particular area of interest. In various exemplary embodiments, the candidate filter selection circuit or routine 311 includes operations similar to, or interacts with, the area of interest analyzing circuit or routine 392 described below, to measure one or more texture characteristics in evaluation regions on both sides of the edge in the area of interest. The candidate filter selection circuit or routine 311 then compares the resulting texture measurements to predetermined criteria associated with the various candidate filter groups and selects the appropriate predetermined candidate filter subset. For example, if there is a low variance value on one side of the border the previously discussed Sobel-type filter can be used. If a directional texture characteristic is detected, Gabor's filters can be used. If a fine non-directional texture is detected on both sides of the boundary, Law's filters can be used. Color filters can be used for color images, and so on. Methods for characterizing various textures are well know to one skilled in the art, and are also discussed in the references cited herein.

It should be appreciated that any known, or later-developed filter and/or set of image filtering steps, can be used in various embodiments of the edge detection systems and methods according to this invention.

It should also be appreciated that the terms "candidate filter" and "selected filter" or "case-specific filter," as used herein in various exemplary embodiments, may encompasses all the necessary functions or components necessary to produce a filtered image using a particular filter function, a feature image resulting from applying a local energy function to a filtered image, a normalized feature image based on the feature image, or the like. Also included may be the functions or operations needed to determine any now known or later developed metric that is suitable for characterizing any of the preceding types of images. More generally, the terms candidate filter and selected filter encompass not only a particular filter function, but any unique functions or components associated with that particular filter function, which must be used by the filtered image analyzing circuit 310, and/or the feature image generating circuit 312 and/or the regions-of-interest generating circuit or routine 313, in various exemplary embodiments, to generate one or more partial filtered image results corresponding to that particular filter function. Thus, the terms candidate filter and selected filter, as used herein, refer to all the unique elements required to determine a corresponding partial filtered image result corresponding to a particular filter function, as described below. Because of their scope in various exemplary embodiments, filters and groups of filters are also sometimes referred to as filter methods herein.

The feature image generating circuit or routine 312, generates at least one feature image or the like based on the selected candidate filters. The feature image generating circuit 312 is applied to the original input image according to the area of interest generated by the area of interest generator 150. In an exemplary embodiment, one feature image $F_k$ is generated for each candidate filter k. A feature image is generated, in general, by filtering the input image data with a particular filter function and applying a local energy function to the filtered image data. The local energy function, in general, rectifies and smoothes the image signals represented in the filtered image data. Exemplary local energy functions included summing the magnitudes of the filtered image pixel values in a window surrounding each pixel to determine each pixel value of the feature image, and summing the squares of the filtered image pixel values in a window surrounding each pixel to determine each pixel value of the feature image.

Furthermore, in an exemplary embodiment, each feature image can be normalized so that the partial filtered image results corresponding to each candidate filter are more easily compared, as described further below. In such cases, the normalized feature image is then the feature image represented by the symbol $F_k$ herein. Normalization methods are well known in the art. For example, the pixel values of each feature image can be normalized to a range which has zero mean and unit variance. In general, any appropriate known or later-developed normalization method can be used.

The regions-of-interest generating circuit or routine 313, allows an automated process, or the user, to define various regions-of-interest within the vicinity of the area of interest. The regions-of-interest generating circuit or routine 313 also determine "partial filtered image results" based on the regions of interest. One partial filtered image result is determined for each region-of-interest in each feature image $F_k$ generated by the feature image generating circuit or routine 312. Each partial filtered image result in a region-of-interest may in various exemplary embodiments be a filtered image, a feature image resulting from applying a local energy function to a filtered image, a normalized feature image, or the like, or any now known or later developed metric that is suitable for characterizing any of the preceding types of images or their known variants. In an exemplary embodiment, the partial filtered image result in a region-of-interest is the average value of the pixel values of a normalized feature image $F_k$ in that region of interest. A "partial" filtered image results should be understood as an "intermediate" result, which may be used to determine one or more "final" filtered image results, also called simply "filtered image results" herein, for a filtered image or feature image. A filtered image result for a filtered image or feature image generally indicates the ability of that image to emphasize or isolate a boundary to be detected according to the systems and methods described herein.

The regions-of-interest generating circuit or routine 313 generates the regions-of-interest based on the data associated with an appropriately located edge tool and/or an operation of the area of interest generator 150. The regions-of-interest are the same or congruent for each feature image $F_k$. In one exemplary embodiment, the regions-of-interest are defined in one or more pairs symmetrically located about a central point approximately on the edge to be located in the area of interest. The central point may be the point P0 described further below. More generally, the regions-of-interest include at least one pair of regions that lie on opposite sides of the boundary in the area of interest. A region-of-interest should be large enough to capture all typical texture characteristics exhibited on one side of the boundary and relatively near the boundary in the area of interest. Generating multiple regions-of-interest surrounding the boundary and/or the central point on the boundary in the area of interest has two advantages. Firstly, if there are texture anomalies such a scratches or dirt in the area of interest, some of the regions-of-interest should be free of the anomalies. Secondly, multiple regions can be generated automatically in a generic fashion, with a very good chance that the regions-of-interest comparing circuit or routine 314 will find a good representative pair of the regions of interest, as describe below. Exemplary regions of interest are also shown and discussed in regard to FIG. 4, below.

The regions-of-interest comparing circuit or routine 314 compares the partial filtered image results previously determined in the various regions-of-interest to pick the representative regions-of-interest pair that best reflect the texture differences on each side of the boundary. In one exemplary embodiment, the regions-of-interest comparing circuit or routine 314 determines the difference between a feature image metric determined in each symmetrically located pair of regions-of-interest by the regions-of-interest generating circuit or routine 313. The difference is determined for each region-of-interest pair in each feature image $F_k$. The feature image metric may be the previously described average value of the pixel values of a normalized feature image $F_k$ in each region-of-interest, for example. The regions-of-interest comparing circuit or routine 314 then picks the regions-of-interest pair that exhibits the greatest difference as the representative regions-of-interest ($RROI_1$ and $RROI_2$), that best reflect the texture differences on each side of the boundary.

In another exemplary embodiment, the regions-of-interest comparing circuit or routine 314 determines a composite value result for each region-of-interest pair, and then picks the $RROI_1$ and $RROI_2$ based on that composite value. Each composite value result incorporates the partial image results of each of the feature images $F_k$. In an exemplary embodiment, a criterion known as the Fisher distance or criterion is used to compare the partial filtered image results determined in each symmetrically located pair of regions-of-interest in each of the feature images $F_k$ individually. The Fisher distance is a quotient with a numerator that is the squared difference between the means of two elements and with a denominator that is the sum of the variances of the two elements. Firstly, the Fisher distance is determined for two elements that are the feature image pixel data in the two regions-of-interest for each feature image $F_k$. Secondly, the composite value result for each region-of-interest pair is determined as the sum of the Fisher distances for that region-of-interest pair for all the feature images $F_k$. The region-of-interest pair having the largest composite value result is picked as the representative regions-of-interest $RROI_1$ and $RROI_2$. It should be appreciated that an analogous Fisher distance procedure can be applied to the underlying feature image pixel data without determining individual Fisher distances for each feature image $F_k$.

Once the regions-of-interest comparing circuit or routine 314 selects the representative pair of regions-of-interest, $RROI_1$ and $RROI_2$, the case-specific filter selection circuit or routine 350, previously discussed with reference to FIG. 1, selects the best case-specific filters from the candidate filters. Such filters are referred to as selected filters herein. The best case-specific filters are the filters that best emphasize or isolate the location of the edge in the current area of interest.

It should be appreciated that a particular candidate filter corresponds to a particular generated feature image $F_k$ and to the associated partial filtered image results and overall filtered image result(s). It should be further appreciated that a selected filter j is effectively selected at the same time that a selected feature image $F_j$ is selected. Thus, in various exemplary embodiments, the case-specific filter selection circuit or routine 350 refines the candidate filter selections by selecting a subset of feature images $F_j$ from the candidate set of feature images $F_k$. The selection is based on consideration of the filtered image results corresponding to the $RROI_1$ and $RROI_2$ of the candidate feature images $F_k$.

The selection is done to reduce the number of filters that need to be applied to the original image, or similar images, in order to generate a pseudo-image which is useful for edge detection. Selecting only the most useful filters achieves faster edge detection and/or improves the accuracy and reliability of detecting the edge using the systems and methods according to this invention. In general, candidate filters are eliminated that do not significantly emphasize differences in the textures on the two opposite sides of the boundary in the area of interest. Specifically, candidate filters are eliminated that do not significantly emphasize differences in the textures in the $RROI_1$ and $RROI_2$.

In one exemplary embodiment, the regions-of-interest comparing circuit or routine 314 has determined the representative Fisher distance for the $RROI_1$ and $RROI_2$ (the R-Fisher distance) of each candidate feature image $F_k$, as outlined above. In such a case, the case-specific filter selection circuit or routine 350 selects feature images $F_j$ that have a significant R-Fisher distance, since a significant R-Fisher distance corresponds to a filter that is useful for emphasizing the boundary in the area of interest. In one exemplary embodiment, the R-Fisher distances for all candidate images $F_k$ are compared and the maximum R-Fisher distance is determined. Then, all feature images/filters having an R-Fisher distance greater than 50% of that maximum R-Fisher distance are selected as the selected feature images $F_j$ and/or selected filters j. In an extension of this embodiment, not more than the best five of the previously selected filters are retained as the selected filters. It is recognized that the selection technique just discussed does not produce an optimal subset of feature images $F_j$ and/or selected filters j. In general, to obtain a "best" subset of feature images requires exhaustive methods that are processor-power and/or time consuming. Thus, exhaustive optimizing techniques are currently not desirable in applications for which the edge detection systems and methods according to this invention are intended.

It should be appreciated that any known or later developed filter selection technique could be used to select the subset of feature images $F_j$ and/or selected filters j. It should also be appreciated that, while the subset of feature images $F_j$ is less than the candidate set of feature images $F_k$, the subset of feature images $F_j$ could be equal to the candidate set of feature images $F_k$. It should further be appreciated that once the case-specific filter selection circuit or routine 350 has selected the subset of feature images $F_j$ and/or selected filters j, the region-of-interest comparing circuit or routine 314 can optimally be used to re-determine the $RROI_1$ and $RROI_2$, this time based only on the selected feature images $F_j$. A different $RROI_1$ and $RROI_2$ may result and should be the $RROI_1$ and $RROI_2$ used for subsequent case-specific operations.

It should be also appreciated that there are a variety of alternative feature selection techniques usable by the systems and methods according to this invention, as will be apparent to one skilled in the art. Further, feature extraction techniques are well-known alternatives to feature selection techniques, and could be used instead of, or in addition to, various operations of the case-specific filter selection circuit or routine 350 and the related operations of the elements 311–314 outlined above. See, for example, the chapter titled Feature Extraction and Linear Mapping for Signal Representation, in the book *Introduction to Statistical Pattern Recognition*, by Keinosuke Fukunaga, Academic, San Diego, 1990. Furthermore, Sobel filters, Law's filters, Gabor filters as well as numerous alternative filters, as well as their various uses and implementation to generate filtered images, feature images, feature vectors, classification vectors, feature extraction, and pseudo-images and the like, are also known to one skilled in the art. See, for example, "Filtering for Texture Classification: A Comparative Study", IEEE Transactions on Pattern Analysis and Machine Intelligence, Vol. 21, No. 4, April 1999; See generally feature selection and extraction, *Statistical Pattern Recognition*, by Andrew Webb, co-published in the USA by Oxford University Press Inc., New York, 1999; "Rapid Texture Identification," Proc. SPIE Conf. Image Processing for Missile Guidance, pp. 376–380, 1980; and "Unsupervised Texture Segmentation Using Gabor Filters," Pattern Recognition, vol. 24, no. 12, pp. 1,167–1,168, 1991.

Furthermore, although various exemplary embodiments of the systems and methods according to this invention are described herein as determining or extracting images, filtered images, feature images, and/or pseudo-images, as well as determining various partial filtered image results, filtered image results, and image metrics usable to evaluate and compare these various image types, it should be appreciated that these terms are not mutually exclusive in various embodiments according of the systems and methods according to this invention. For example, as is apparent from the nature of the mathematic transforms and algorithms employed herein, a portion of a filtered image or feature image may also operate as, or be derivable from, a related partial filtered image result. Thus, these terms are used in various contexts herein for the purpose of describing of various operations, but are not intentionally used in a mutually exclusive sense.

In particular, various operations herein are described as determining one or more feature images, partial filtered image results, and/or filtered image results. Various other operations are described as making a selection based on or between the previously determined images and/or results. It should be appreciated that the dividing line between related determining and selecting types of operations is largely arbitrary. For example, it is clear that a more primitive feature image, partial filtered image result, and/or filtered image result could be selected by a more refined selector which compensates for any deficiencies of the more primitive element in order to achieve the objectives of this invention. Conversely, it is clear that a more primitive selector may be used with more refined feature images, partial filtered image results, and/or filtered image results which compensate for any deficiencies of the more primitive selector in order to achieve the objectives of this invention. Thus, it should be appreciated that in various exemplary embodiments, the various operations associated with "determining" and "selection" may be interchanged, merged, or indistinguishable.

Once the case-specific filter selection circuit or routine 350 has selected the subset of feature images Fj and/or selected filters j, the pseudo-image generating circuit or routine 360, previously discussed with reference to FIG. 1, operates to generate a pseudo-image based on the selected filters j, also called case-specific filters herein.

In one exemplary embodiment, if a set of normalized feature images $F_j$ are not currently generated or available from the memory 130, the pseudo-image generating circuit or routine 360 causes the feature image generating circuit or routine 312 to generate a set of normalized feature images $F_j$ based on the subset of case-specific filters j, according to previously described operations. The pseudo-image generating circuit or routine 360 then determines a pair of classification vectors CV1 and CV2 corresponding to the $RROI_1$ and the $RROI_2$, respectively.

The classification vector CV1 can include the mean value of the pixel data in the $RROI_1$ of each of the normalized feature images $F_j$ corresponding the case-specific filters j. Thus, the dimension of CV1 is n, where n is the number of case-specific filters j selected by the case-specific filter selection circuit or routine 350 as outlined above. CV2 is a similar vector, similarly determined, based on the pixel data in the $RROI_2$ of each of the normalized feature images $F_j$. After the classification vectors CV1 and CV2 have been determined, the pseudo-image generating circuit or routine 360 generates the pseudo-image that will be used in performing the current set of edge location operations. The pseudo-image is generated for at least the previously described area of interest. This exemplary embodiment is based on comparing the data of the normalized feature images $F_j$ to the classification vectors CV1 and CV2.

A classifier can be used by the pseudo-image generating circuit or routine 360 to generate the pseudo-image. The classifier can be a data clustering technique where, in this case, a feature vector, i.e., also called a pixel feature vector, corresponding to the spatial location of a pixel in the area of interest is determined to belong to a cluster or region specified by a membership grade. As used herein, a pixel feature vector (PFV) includes the feature pixel values for a corresponding spatial location in each of the normalized feature images $F_j$ corresponding the case-specific filters j. Thus, the dimension of a pixel feature vector is n, where n is the number of case-specific filters j selected by the case-specific filter selection circuit or routine 350 as outlined above. Furthermore, the elements of the PFV's are ordered similarly to the elements of CV1 and CV2, and are based on the same underlying feature image pixel data, for example, normalized feature image pixel data. Thus, corresponding elements of the PFV's and CV1 and CV2 may be meaningfully compared.

Each pixel location of at least the area of interest is in turn selected by the pseudo-image generating circuit or routine 360. The classifier is applied by the pseudo-image generating circuit or routine 360 to the corresponding pixel feature vector to determine whether that pixel feature vector is more like the CV1 corresponding to $ROI_1$, or more like the CV2 corresponding to $ROI_2$. For example, the Euclidean distance may be used to determine respective "distances" between a current PVF and CV1 and CV2, respectively. The Euclidian distance to CV1 or CV2 is the sum of the squares of the differences between corresponding elements of the current PVF and CV1 or CV2, respectively. The smaller the Euclidian distance, the more the two vectors compared by that Euclidian distance resemble each other. Based on the Euclidian distance, or the component elements of the Euclidian distance, a membership value is determined and assigned to the pixel of the pseudo-image that corresponds the currently evaluated pixel feature vector.

In a sense, the pseudo-image pixel value indicates the degree to which that pixel "belongs" on the side of the border of $RROI_1$ or on the side of the border of $RROI_2$. In an exemplary embodiment, each pseudo-pixel is assigned a value between 0.0, which represents complete membership to the side of the border of $RROI_1$, and 1.0, which represents complete membership to the side of the border of $RROI_2$.

In one particular embodiment, the membership values are determined using a fuzzy c-means classifier modified as described below, based on a fuzzy c-means classifier described in the article "FCM: The fuzzy c-Means Clustering Algorithm", Computers & Geosciences, Vol. 10, No. 2–3, pp 191–203, 1984, which is incorporate herein by reference. Using the symbols as defined in that article, the classifier parameters are set as c=2 (two clusters), m=2 (weighting exponent), v=CV1, CV2, as defined herein (vectors of centers), norm=Euclidean distance, n=number of data=number of pixels in the tool area of interest. In a preferred modified version of this algorithm, there are no iterations and the clustering is done with initial centers that are the clusters v=CV1, CV2. Because well-defined prototype clusters CV1 and CV2 are used, clustering may be stopped after the first iteration, i.e. the first classification, and good results are still obtained. It should be appreciated that this set of parameters produces a non-linear classification, emphasizing membership value variations near the boundary.

In general, this fuzzy clustering algorithm produces two membership images: The first one is the membership value of each pixel to cluster 1 and the second is the membership value of each pixel to cluster 2. However, because the sum of memberships for each pixel location must be unity for our case, the membership images are complementary and we need only determine one of them.

It should be appreciated that there are a wide variety of alternatives for generating various pseudo-images based on a set of feature images. Such alternatives include alternative fuzzy classifiers, neural classifiers, a hidden mark-up model or any other now known or later-developed technique or algorithm which is capable of generating a set of pseudo-image pixel values usable in accordance with this invention. Furthermore, when another type of classification or pseudo-image generation is performed, it should be appreciated that the membership function operations described above may be replaced by any other appropriate operations for applying weighting factors to the various filtered image results or feature image results corresponding to each pixel location, in order to accord them greater or lesser values based on their similarity to the characteristics of RROI1 or RROI2. Various alternatives usable with the system and methods of the invention will be apparent to one skilled in the art.

Once the pseudo-image generating circuit or routine 360 has generated a current pseudo-image, the edge point analyzing circuit or routine 370, as previously discussed with reference to FIG. 1, can operate to determine one or more edge points along the boundary in the area of interest. In various exemplary embodiments of the edge point analyzing circuit or routine 370, elements 377–379 can operate as follows:

The scan line determining circuit or routine 377 can determine one or more edge-detection scan lines and the direction or polarity of "traversing" the scan lines in a known manner such as that used in commercially-available machine vision systems, such as the QUICK VISION™ series of vision inspection machines and QVPAK™ software available from Mitutoyo America Corporation (MAC), located in Aurora, Ill. Generally, the scan line determining circuit or routine 377 determines the scan lines based on the data associated with an appropriately located edge tool on the input image and/or an operation of the area of interest generator 150. The operator input may influence the spacing of the scan lines, or a default value such as 5 or 20 pixel units, or a percentage of a width of the area of interest can be automatically set as a default value. The scan lines extend across the boundary in the pseudo-image. The direction or polarity of traversing the scan lines to perform edge detection operations is determined based on the pseudo-image characteristics in the vicinity of the edge. The direction of traversing the scan lines can generally proceed from a region with less variation to a region with more variation. More generally, the direction of traversing the scan lines should proceed in that direction that provides edge detection results that are less noisy.

The edge point detection circuit or routine 378 estimates an edge point along each scan line determined by the scan line determining circuit or routine 377, according to any now known or later-developed set of edge-point detection operations. The values along each scan line in the pseudo-image constitute a one-dimensional signal. In one exemplary embodiment the edge point is a point of maximum gradient along the scan line signal in the pseudo-image. It should be appreciated that any known or later developed edge detection operation used on gray-scale intensity images and the like may be applied to detect and estimate the edge position in the pseudo-image.

The edge point detection circuit or routine 378 may also record one or more edge detection parameters associated with the estimated edge points in one or more portions of the memory 130, so that a case-specific edge-detection operation can be run automatically using the recorded parameters for edge-detection and/or edge point reliability evaluation. Such parameters may include various characteristics of the scan line pseudo-pixel value profiles which characterize the edge, such as the pixel value change across the edge, the direction of pixel value increase across the edge, the number or proportion of scan lines across the edge that include pixel value changes above a threshold value, and the like. In one exemplary embodiment, the mean value of each characteristics is the value recorded as the basis for case-specific automatic "run-time" edge measurements performed later. This will tend detect only those edge points that have a fairly high initial reliability.

The edge point refining circuit or routine 379 may then perform operations to refine one or more initial edge point estimates, based on additional information. In one exemplary embodiment the edge point refining circuit or routine 379 performs an analysis operation on a plurality of pixel locations in a local region extending on both sides of an initially estimated edge point along a direction generally parallel to the scan line. In one exemplary operation, data associated with a number of closest pixel locations q along a selected detected edge point's scan line are used to refine the position of the initially estimated edge point. For each pixel location i of the q pixel locations surrounding the initially estimated edge point, the edge point refining circuit 379 calculates the Euclidian distance, discussed above, between the (i+1) pixel location and the (i−1) pixel location based on those particular pixel locations in a current set of feature images produced by the feature image generating circuit or routine 312 and selected by the case-specific filter selection circuit 350. These Euclidian distance values located at each of the q pixel locations form a curve. The analysis operation then determines a centroid location for the area under the curve. The centroid location is in terms of the pixel locations, and thus determines the refined edge point estimate along the scan line. In one exemplary embodiment, the edge point refining circuit or routine 379 refines each initial edge point estimate using the centroid location operations.

The edge point refining circuit or routine 379 may also perform operations such the operations described below with reference to the steps S1651–S1662 of FIG. 14, and/or the steps S2520–S2560 of FIG. 16. for the purpose of validating initially determined edge points and increasing their reliability. In various other exemplary embodiments, the edge point refining circuit or routine 379 interacts with the boundary locating and refining circuit or routine 380, which determines the edge points to be refined, as previously described with reference to FIG. 1.

The edge point refining circuit or routine 379 may also revise one or more edge detection parameters previously determined and/or recorded by the edge point detection circuit or routine 378. It may also add or record one or more edge additional edge detection parameters associated with the refined edge points in one or more portions of the memory 130, so that a case-specific edge-detection operation can be run automatically using the recorded parameters for edge-detection and/or edge point reliability evaluation.

In various exemplary embodiments of the boundary locating and refining circuit or routine 380, elements 381–383 can operate as follows:

The shape analysis circuit or routine 381 analyzes a plurality of estimated edge points to determine if they correspond to criteria for a reliable edge detection. In one exemplary embodiment, the criteria includes a threshold value for a shape score based on the deviation between a line (which may be a curved line) fit to the estimated points and an expected edge shape; a threshold value for a location score based on the deviation between the line fit to the estimated points and an expected edge location; and an outlier threshold value based on the standard deviation of the individual edge point distances from the line fit to the estimated edge points. The expected edge shape and location are set by the operator of the vision system using edge tool selection and placement, or by other user input, or automatically based on various CAD data operations. Based on the results of the operations of the shape analysis circuit or routine 381, the outlier elimination circuit 382 selects one or more edge points failing the outlier threshold value criterion for elimination or refinement. In various exemplary embodiments, the edge point refining circuit or routine 379 performs the edge point estimate refinement as previously described, and the shape analysis circuit or routine 381 and the outlier elimination circuit 382 recursively analyze the plurality of estimated/refined edge points until the remaining estimated edge points are finally determined to constitute a reliable or unreliable edge. For an unreliable edge, the outlier elimination circuit outputs a corresponding error signal on the data/control bus 140. It should be appreciated that in various exemplary embodiments, the operations of the shape analysis circuit or routine 381 and the outlier elimination circuit 382 may be merged or indistinguishable. For a reliable edge, the edge location determining circuit 383 determines the final edge location data, which may include the final estimated edge points and/or other derived edge location parameters and outputs the data on the data/control bus 140 to one or more portions of the memory 130 and/or the input/output interface 110.

In various exemplary embodiments of the edge mode determining circuit or routine 390, elements 391–392 can operate as follows:

The edge tool interpreting circuit or routine 391, which, for each particular edge case, determines the appropriate mode of operation for the various other elements performing the edge detection operations based on the edge tool data associated with that particular edge case. The appropriate mode of operation is based on whether the particular edge in the area of interest is appropriately analyzed by edge detection operations applied to the input image or edge detection operations applied to a pseudo-image, as previously described. In a first exemplary embodiment, unique edge tools are exclusively associated with input image edge detection for well-defined edges and pseudo-image edge detection for significantly textured edges, respectively. In such a case, the edge tool interpreting circuit or routine 391 interprets the type of edge tool associated with a current edge case and operates accordingly. In a second exemplary embodiment, the edge tools include secondary selectable features, such as a check box or the like, which are exclusively associated with input image edge detection for well-defined edges and pseudo-image edge detection for significantly textured edges, respectively. In such a case, the edge tool interpreting circuit or routine 391 interprets the secondary edge tool feature associated with a current edge case and operates accordingly.

However, in various other exemplary embodiments, one or more edge tools can have no characteristic or feature that is exclusively associated with input image edge detection for well-defined edges or pseudo-image edge detection for significantly textured edges. In such cases, the area of interest analyzing circuit or routine 392 can determine the appropriate edge detection mode. Here, the area of interest analyzing circuit or routine 392 can automatically determine at least one texture characteristic, such as a local variability value, in evaluation regions on both sides of the edge in the area of interest. The location of the evaluation regions is based on the data associated with an appropriately located edge tool and/or an operation of the area of interest generator 150. The area of interest analyzing circuit or routine 392 then can automatically select the appropriate mode of edge detection based on the determined texture characteristics and establishes the appropriate mode of operation for the various other elements performing the edge detection operations for that particular edge case.

Figure 3A:
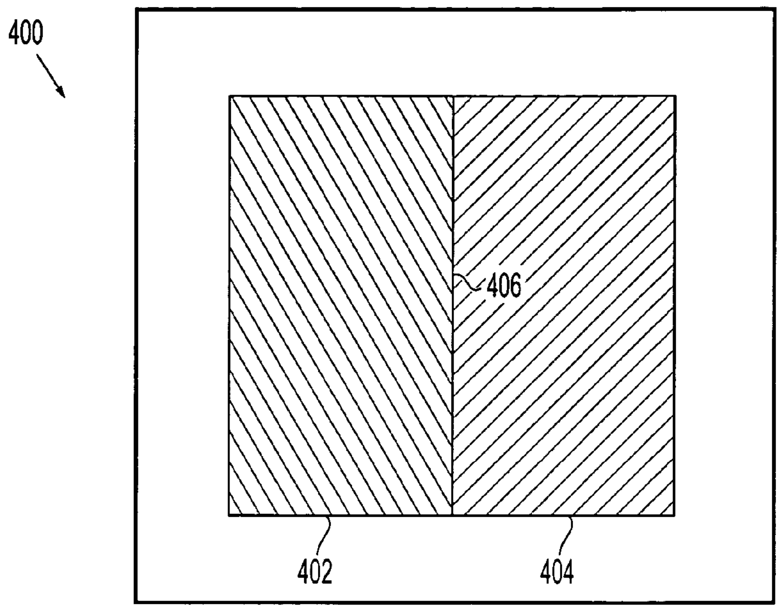
FIG. 3 illustrates two images of exemplary objects having two significantly textured regions and a boundary that can be detected and located using the edge tools and edge detection systems and methods according to this invention.
Figure 3B:
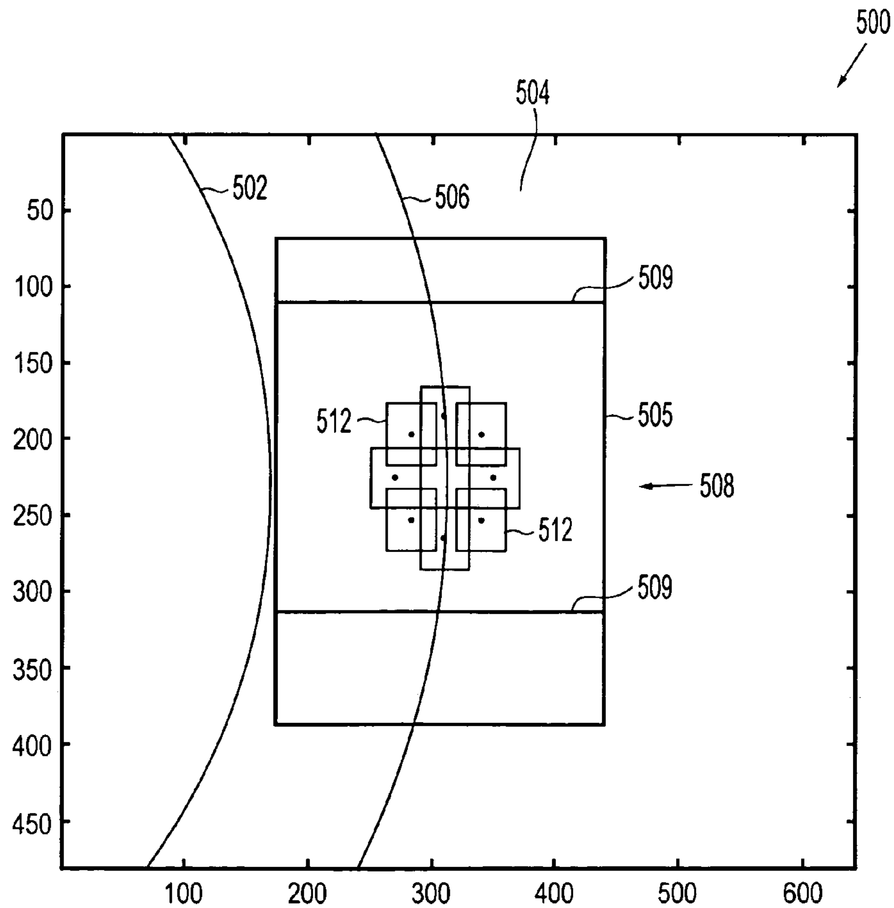

FIG. 3 illustrates two images of exemplary objects having a significantly-textured edges that can be detected and located using the edge detection systems and methods according to this invention. The image 400 includes an edge/boundary 406 that can be precisely located with various embodiments of the boundary detection or edge detection systems and methods according to this invention. The image 400 has an edge/boundary 406 that exists between a first portion 402 of the image 400 and a second portion 404 of the image 400. The image 400 is the image of an object that has been captured by the vision system 10 as described with reference to FIG. 1.

Before the edge detection systems and methods of this invention can be used in an automated mode to locate edges or boundaries during a run mode, the edge detection systems and methods according to this invention must be set up to detect specific edges using specific image-derived parameters. Using an image that has been captured by the vision system 10, that acquired image is used by the edge location operation as an input image 500. FIG. 3 shows one exemplary embodiment of the input image 500 that can be used with the edge detection systems and methods of this invention. The input image 500 has an edge 506 that is defined in between a first portion 502 and a second portion 504 of the input image 500.

After the input image 500 is acquired, the input image 500 is displayed on the display 102 so that a user can define an area-of-interest using a graphical user interface and positioning a boundary detection tool, also referred as an boundary tool or edge detection tool, on a particular edge or portion of an edge to be detected. The area-of-interest is defined by the area of interest generator 150 based on the data corresponding to the positioned edge tool. One exemplary boundary tool 508 includes a box 505 configurable by the user to outline and determine the area-of-interest. For example, the box may be configured in an arc or circle shape, or in the shape of a rectangle as shown in FIG. 3. However, it should be appreciated that the boundary detection tool 508 can be drawn in any shape that allows an area of interest to be defined by the user or an automated process. The boundary tool 508 also includes region-of-interest indicators 512 shown as overlapping identical rectangles in FIG. 3. In various other embodiments, the edge tool is an edge point tool, and the area of interest and the region of interest indicators are not indicated on the display, but are determined automatically by the previously described area of interest generator 150 and the filtered image analyzing circuit 310, respectively, based on a simple point cursor positioned by the user. Various other exemplary edge tools are apparent in the previously referenced commercially-available machine vision system and the like.

After the boundary detection tool 508 has been drawn on the input image 500, the user can define a point-of-interest (P0) within the area-of-interest bounded by the boundary tool 508. Alternatively, the point of interest P0 is automatically determined relative the position of the boundary detection tool 508 and may not be visible on the display. The point of interest P0 is generally, or possibly, only indicative of a point on the boundary, or edge. The user can also direct the edge location operation to focus on the point P0. Moreover, the user can define a distance between various "scan" lines 509 extending across the boundary in the area of interest. Alternatively, based on the previously discussed boundary detection tool operations and information, the previously described edge point analyzing circuit 370 can automatically determine the distance between the scan lines 509 and the end points, i.e., (x1, y1), (x2, y2) of each scan line 509 extending across the boundary in the area of interest. Similarly the previously described filtered image analyzing circuit or routine 310, can automatically determine the locations of the regions-of-interest indicated by the region-of-interest indicators 512. Thus, operations associated with the boundary detection tool 508 can be manually defined by user input or by an automated process using predefined boundary detection tool characteristics. By allowing the user to select a boundary detection tool having predefined characteristics, boundary detection operations can be directed by operators having little or no understanding of the underlying mathematical or image processing operations.

Figure 4B:
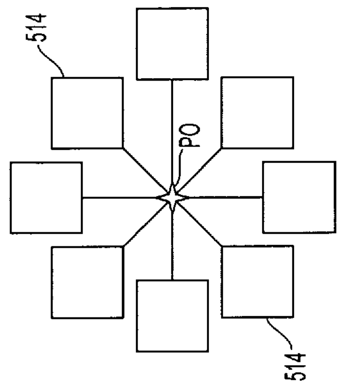
FIG. 4 illustrates exemplary regions-of-interest generated by and usable with the systems and methods according to this invention.
Figure 4A:
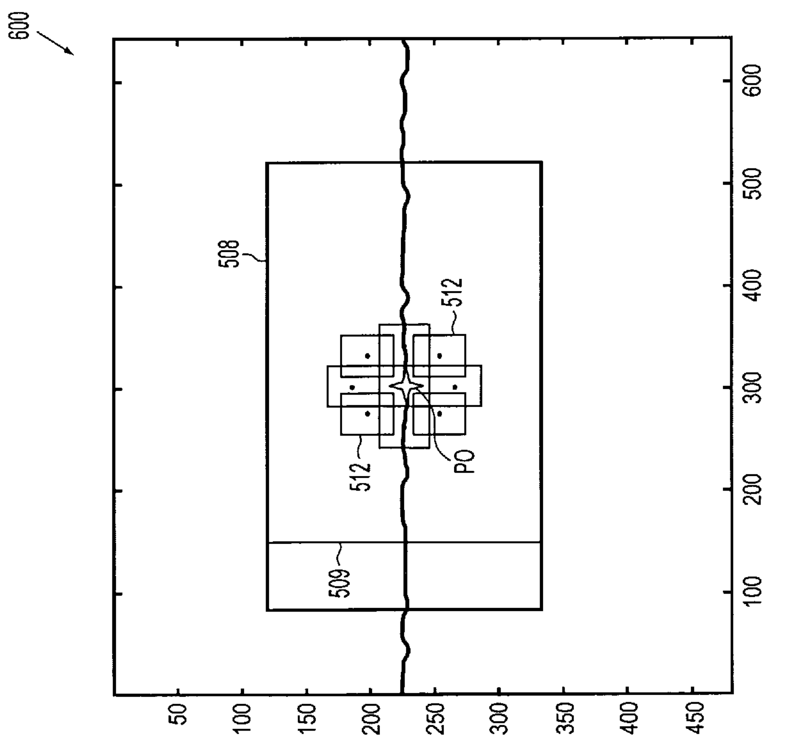

In FIG. 4, the boundary detection tool 508, scan lines 509 and regions-of-interest indicators 512 are illustrated relative to yet another input image 600. For purposes of clarification, FIG. 4 illustrates another exemplary set regions-of-interest, indicated by the regions-of-interest indicators 512, that are generated by and usable by the systems and methods according to this invention. It should be appreciated that the regions of interest indicators are not displayed in some embodiments, and that a region of interest originally generated relative to an input image also comprises a spatially congruent region of interest in any other corresponding filtered image, feature image, pseudo-image, or the like, described herein. As previously described, the regions-of-interest can be determined automatically or the user can determine them by dragging and dropping displayed region of interest indicators 512, for example. As previously described, the regions of interest may be arranged in symmetric or approximately symmetric regions-of-interest pairs 514 around the central point P0. FIG. 4 shows 4 regions-of-interest pairs. Furthermore, in an alternative to the previously described automatic operations for determining the representative regions of interest $RROI_1$ and $RROI_2$, the user can select an $RROI_1$ and an $RROI_2$ that are located on opposite sides of the point-of-interest P0 and arranged along a line generally perpendicular to the boundary and within of the area-of-interest. However, it should be appreciated that the best $RROI_1$ and an $RROI_2$ will not generally or necessarily be a regions-of-interest pair arranged along a line generally perpendicular to the boundary.

Figure 5:
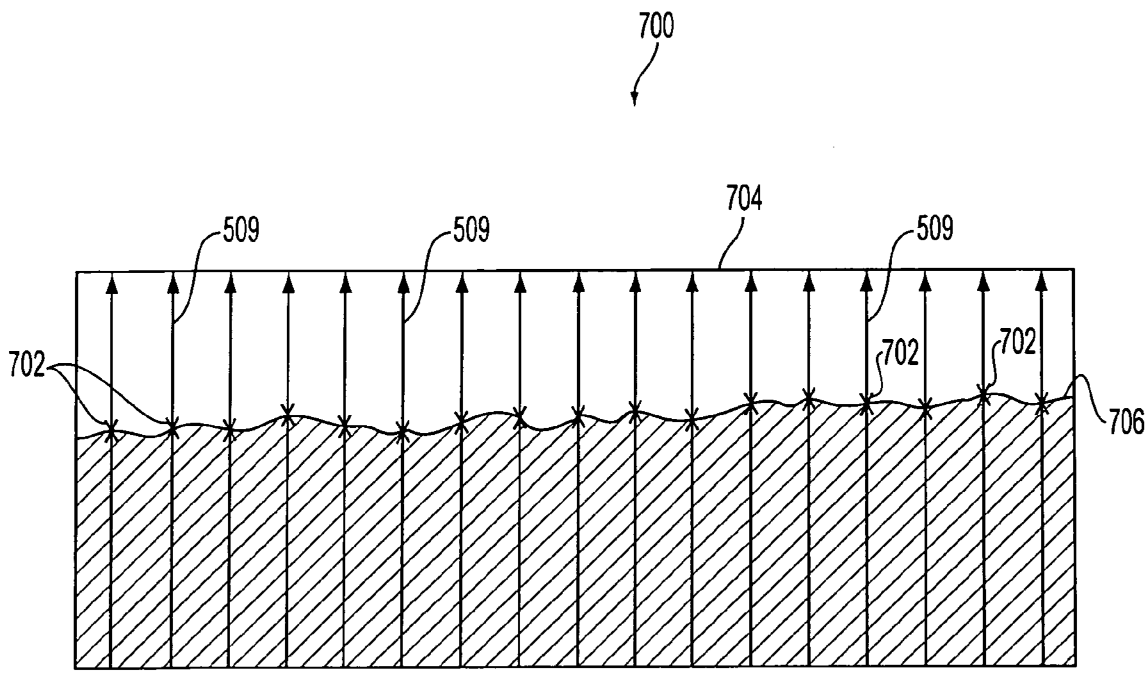
FIG. 5 illustrates an image of one exemplary embodiment of a pseudo-image with a scan line used with various embodiments of the systems and methods according to this invention.

FIG. 5 illustrates one exemplary embodiment of a pseudo-image 700 generated by the pseudo-image generating circuit or routine 360, as previously described. It should be appreciated that the pseudo-image need not be displayed, and is generally not displayed by the systems and methods according to this invention.

More generally, various exemplary embodiments of the systems and methods according to this invention are described herein as generating a various "images" as the basis for an image result which is evaluated. However, it should be appreciated that the image result may be determined from a variety of data representations not generally recognized as an "image". Provided that such data representations are usable to provide one or more image results which are usable according to the systems and methods of this invention, such data representations are included in the scope of the terms "feature image" or "pseudo-image", and the like, and thus are within the scope of the systems and methods according to this invention. It should be further appreciated that, in various other exemplary embodiments, depending on the image results to be determined, the image result may be determined directly from the input image and the appropriate candidate or selected filters without needing to represent or generate recognizable image as a recognizable intermediate step.

Nevertheless, the pseudo-image 700 is useful for purposes of clarification. As previously described, the pseudo-image 700 is spatially congruent with the input image, and thus with the various tool elements and regions of interest previously described with reference to FIGS. 3 and 4. It should be appreciated that the particular pseudo-image 700 corresponds to a magnified input image and therefore can support high-accuracy edge location despite the blurred appearance of this particular image. The direction of traversing the scan lines 509, as indicate by the arrowheads on the scan lines 509, can be determined as previously described. The pseudo-image 700 need only be determined in the area of interest, bounded by the line 704 in FIG. 5. The edge points 702, indicated "x's" along the edge/boundary 706 in the pseudo-image 700 are determined as previously described. Because the pseudo-image is spatially congruent with the input image, the edge points determined for the pseudo-image are easily displayed on a graphical user interface including the input image, in various exemplary embodiments of the systems and methods according to this invention.

Figure 6:
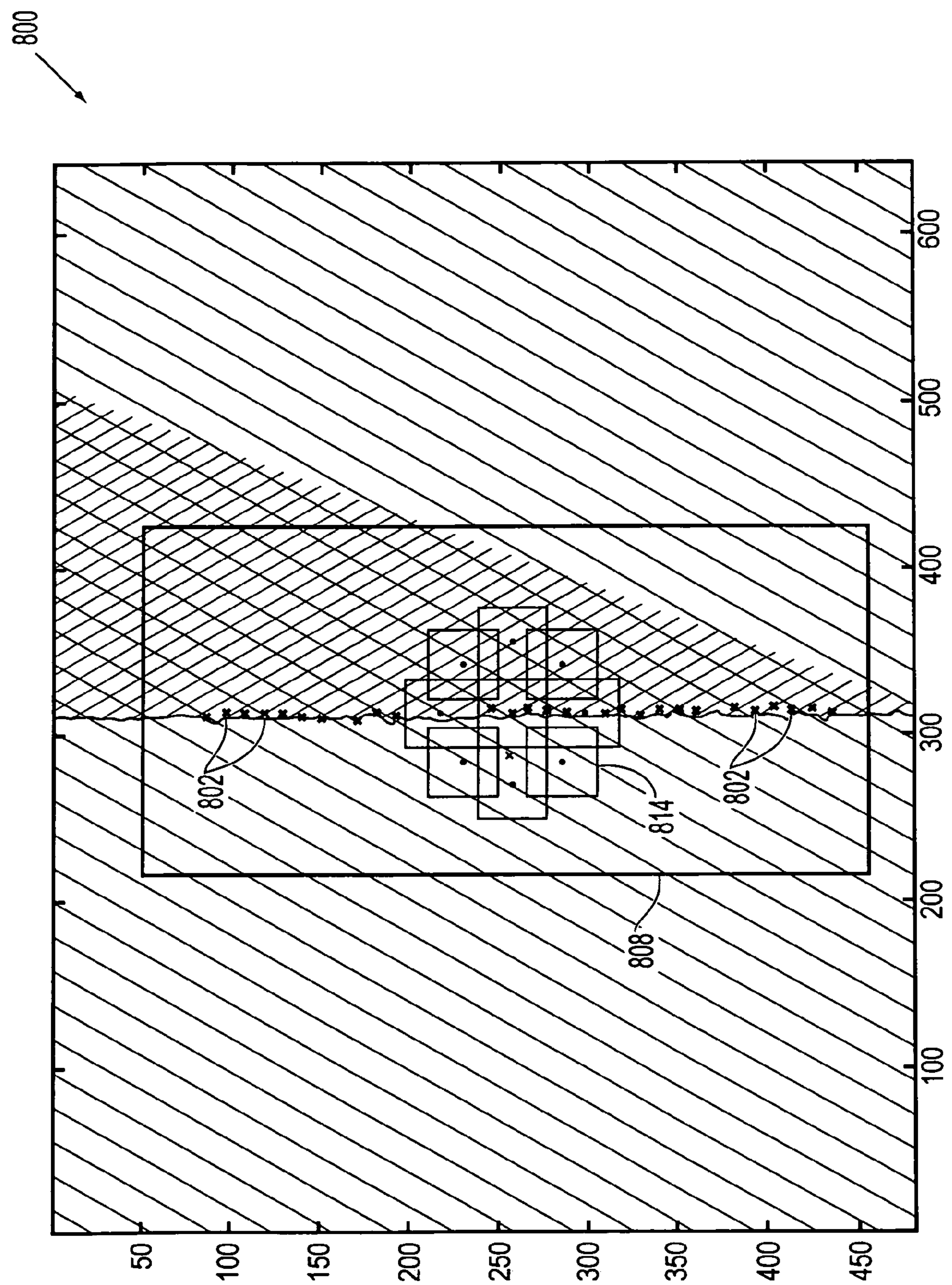
FIG. 6 illustrates an image of one exemplary embodiment of multiple edge locations detected using the edge detection systems and methods according to this invention.

FIG. 6 illustrates one exemplary embodiment of multiple edge locations 802, determined for an exemplary input image 800, detected by an exemplary edge point analyzing circuit or routine 370 employing the previously described gradient-type edge detection operations. Because the pseudo-image is spatially congruent with the input image, the edge points 802 determined for the pseudo-image are easily displayed as the edge points 802 on a graphical user interface including the input image, in various exemplary embodiments of the systems and methods according to this invention. The regions-of-interest indicators 814 and the limits of a boundary tool 808 are also shown in FIG. 6.

In a part-programming or training mode of the vision system 10, in an exemplary embodiment, a display including elements such as the elements 800, 802, 808, for example is displayed to the user once the edge points 802 have been determined. If the user approves of the displayed edge points 802 and any associated edge location data that may also be generated and output, the user accepts the results through one or more actions, which may be as little as moving on to performing a new operation with the vision system 10. Once user acceptance is indicated by any means, the control system portion 100 stores the various previously describe operations and parameters used to determine the edge points 802 as a case-specific routine or a case-specific trained edge/boundary detection tool in the part program memory portion 133. The control system portion 100 may also store the associated edge location data that was generated and output, in the memory 130. The case-specific routine or trained edge/boundary detection tool stored by the control system portion 100 is generally stored and/or included in one more part programs, and are usable to automatically, quickly and reliably detect and locate edges in similar cases in a "run mode". The similar cases where the case-specific routine and/or trained edge/boundary tool may be advantageously usable include, for example, cases such as locating the identical edge in the future, locating another portion of the same edge on the same part, i.e., in a different field of view, locating the "same" edge on a future part produced according to the same specifications, and locating other edges made by the same process, such as edges on a variety of similar holes in various locations on a flat sheet, such as printed circuit board holes. These and other type of similar-edge cases will be apparent to those skilled in the art and to typical user of machine vision systems and according these examples are in no way limiting.

A more detailed description of the run mode process will be described with reference to FIGS. 15 and 16

Figure 7:
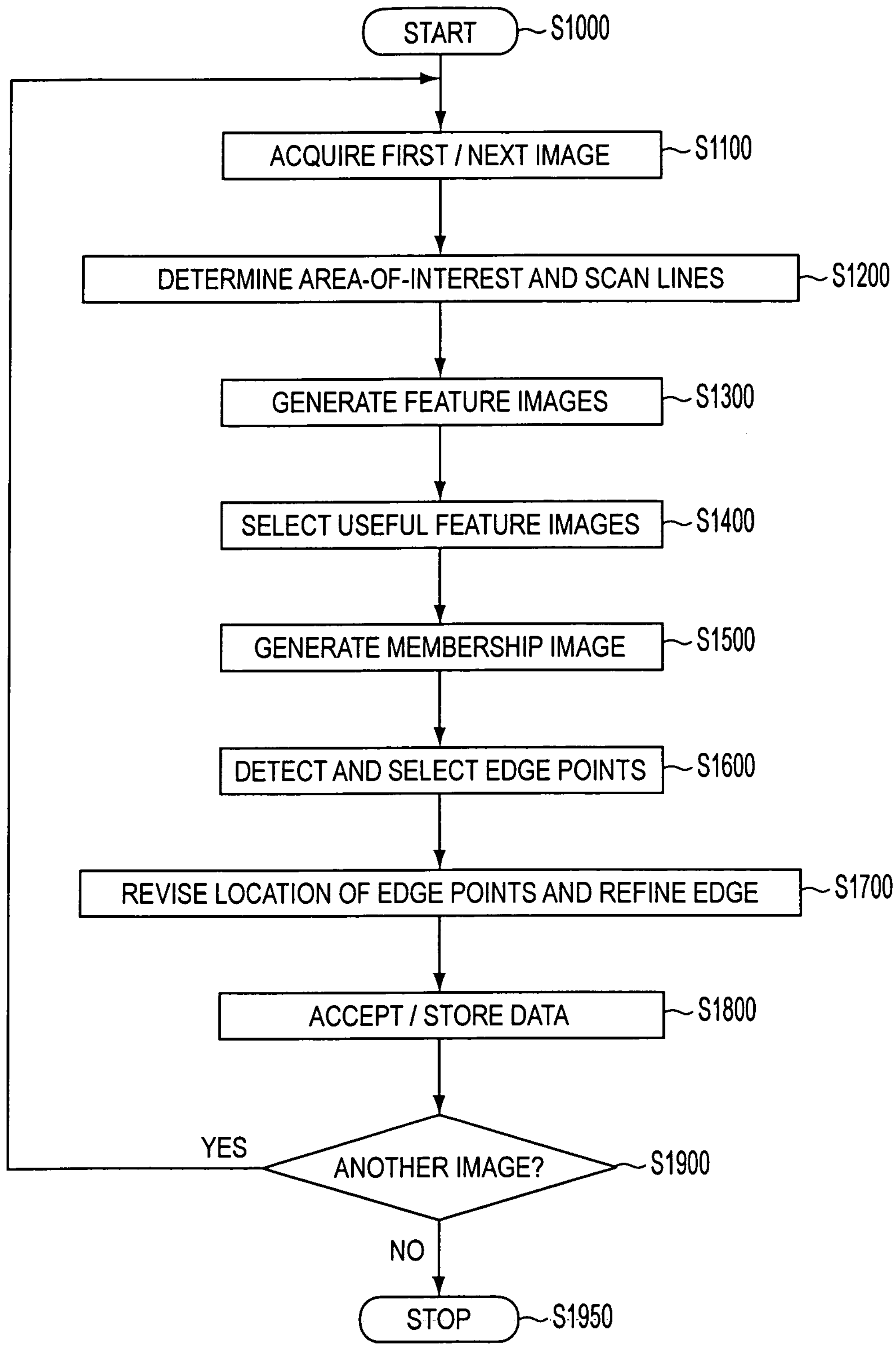
FIG. 7 is a flowchart outlining one exemplary embodiment of a method for determining edge locations in an image according to this invention.

FIG. 7 is a flowchart outlining one exemplary embodiment of a method for training a boundary detection tool to detect a specific case of an edge in an input image according to this invention. A trained boundary detection tool can be usable by a fast and reliable automatic boundary detection routine, such as may be included in a part program for inspecting similar cases of edges on similar parts. After beginning operation in step S1000, operation proceeds to step S1100, where a first or next input image is acquired. Then, in step S1200, an area of interest within the input image is determined and scan lines extending across the determined area of interest are determined. Next, in step S1300, one or more feature images of at least the area of interest are generated. Operation then continues to step S1400.

In step S1400, those feature images generated in step S1300 are analyzed to determine and select those feature images that are usable to distinguish a first region-of-interest, on one side of the specific edge to be detected from a second region-of-interest on the other side of the specific edge to be detected. As outlined above, some of the generated feature images, in view of a selected representative pair of regions-of-interest, may not have sufficiently different feature pixel values on the two sides of the edge to support reliable edge detection. In step S1400, the initial set of feature images can be reduced if any of the feature images would not be useful in improving the edge detection.

Next, in step S1500, a membership image is generated that indicates the membership value of each pixel in at least the area of interest in relation to two clusters. The centers of the two clusters are based on the characteristics of the selected representative pair of regions-of-interest selected in step S1400. The membership values are based on the cluster center characteristics and the feature images generated in step S1300 and selected in step S1400. The two clusters used in creating the membership image represent the two types of feature image data on each side of the edge to be detected reflected in the selected feature images selected in step S1400. Then, in step S1600, edge points along the scan lines are determined based on the membership image generated in step S1500, and "good" edge points are selected from the detected edge points. Operation then proceeds to step S1700.

In step S1700, for each kept detected edge point from step S1600, a close "neighborhood" of the detected edge point is analyzed to correct the location of the detected edge point and a group of detected edge points is analyzed to eliminate outliers. In step S1700, operations such as one or more of the operations previously described with reference to the edge point refining circuit 379 and the boundary locating and refining circuit 380 are performed. In one exemplary operation, data associated with a number of closest pixel locations q along a selected detected edge point's scan line are used to refine the position of the selected detected edge point. For each pixel location i of the q pixel locations surrounding the selected detected edge point, the edge point refining circuit 379 calculates the Euclidian distance between the (i+1) pixel location and the (i−1) pixel location based on those particular pixel locations in the current set of feature images. These Euclidian distances for each of the q pixel locations form a curve. Subsequently, the centroid of the curve is used as the refined location of that selected detected edge point. The boundary locating and refining circuit 380 analyzes a group of selected detected edge points to detect and correct or eliminate outliers. Next, in step S1800, the boundary detection tool data that represents the information determined to detect this specific case of edge in input image that has been created in the training mode is accepted and/or stored. Acceptance may be determined by the user based on a display of the final set of edge points or associated boundary location data. As a default condition, the boundary detection tool data may be stored without specific acceptance. Next, in step S1900, a determination is made whether another input image is to be acquired If another image is to be selected and analyzed, then operation returns to step S1100. Otherwise, operation proceeds to step S1950 where operation of the method stops.

Figure 8:
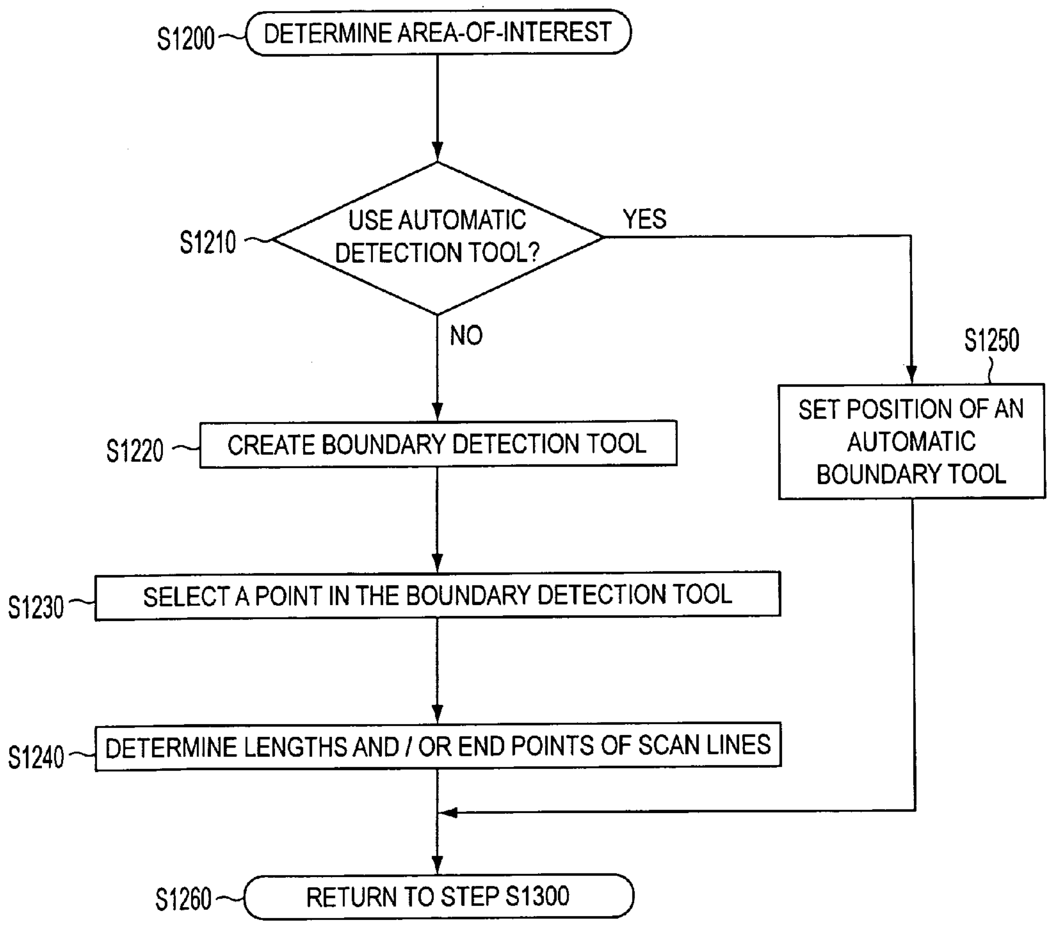
FIG. 8 is a flowchart outlining in greater detail one exemplary embodiment of the method for determining an area-of-interest of FIG. 7 according to this invention.

FIG. 8 is a flowchart outlining in greater detail one exemplary embodiment of the method for determining an area-of-interest of step S1200. After the operation begins in step S1200, operation proceeds to step S1210 where the user determines whether the edge location operation will use an automatic boundary detection tool to reflect an area of interest within or through which the specific edge to be detected. If the user will not use an automatic boundary detection tool, operation proceeds to step S1220. Otherwise, operation jumps to step S1250. In step S1220, the user manually draws and/or edits a boundary detection tool as previously described above to select the boundary to be located and the desired area of interest. Then, in step S1230, the user selects a point P0 within the area of interest bounded by the created boundary detection tool, and preferably close to the boundary, to focus the edge detection process. It should be appreciated that the point P0 may also be generated as part of the process of drawing a tool, and the operations of steps S1220 and S1230 may be indistinguishable. In step S1240, the scan lines' position or spacing along the boundary, and the lengths or the end points of the scan lines, are determined by user input or by default positions derived from the selected area of interest. Operation then jumps to step S1260.

In contrast to steps S1220, S1230, and 1240, in step S1250, an automatic boundary detection tool is used. Various automatic boundary detection tools may have various scopes of operations. As one example, the user may select an appropriate tool, such as a point tool, or a box tool, and then do as little as "position" a cursor/pointer element of the tool near a point intended as "P0" and the tool will then automatically determine any of the previously discussed tool parameters which are required for edge detection using that tool. Scan lines can also be automatically defined. Operation then continues to step S1260. Then, in step S1260, operation returns to step S1300.

Figure 9:
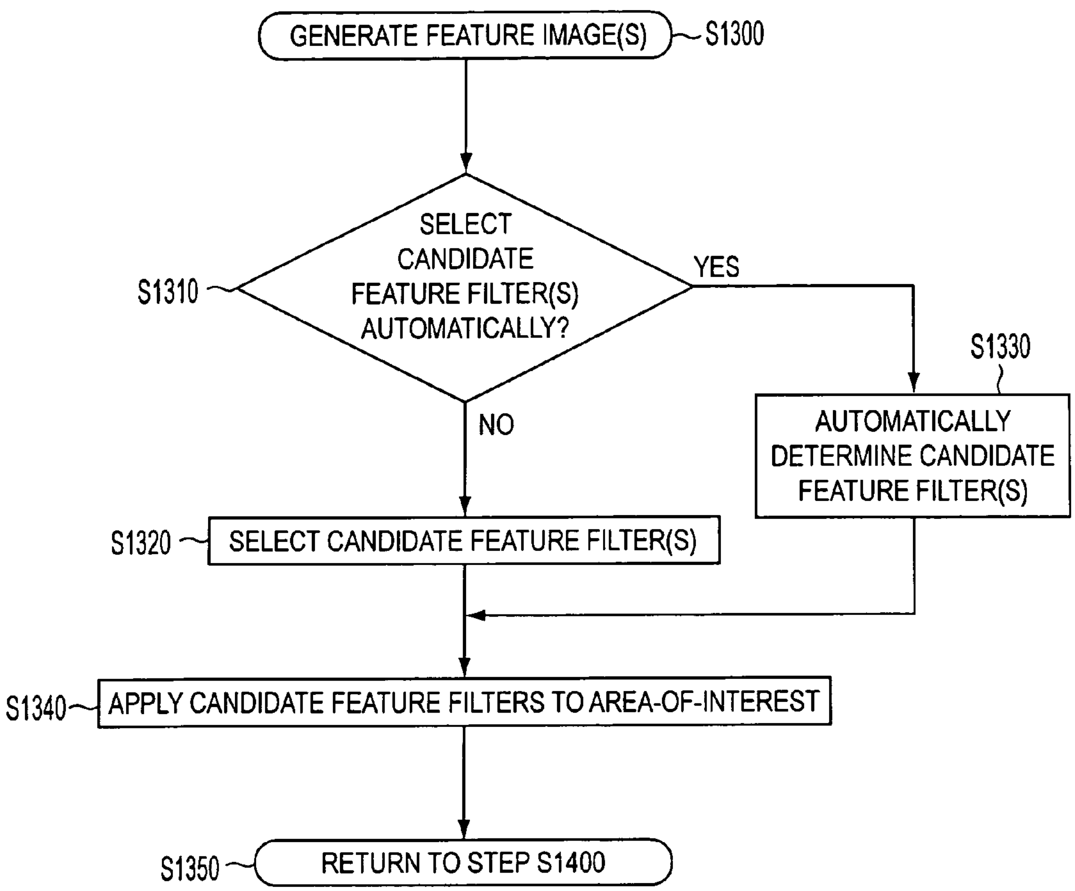
FIG. 9 is a flowchart outlining in greater detail one exemplary embodiment of the method for determining feature images of FIG. 7 according to this invention.

FIG. 9 is a flowchart outlining in greater detail one exemplary embodiment of the method for generating feature images of step S1300. Beginning in step S1300, operation proceeds to step S1310, where a determination is made whether the user will select a candidate filter group manually or have the candidate filter group automatically determined. As previously discussed, the term candidate filter implies that the filter will be used in generating a filtered image result from a current image, but that it will be accepted or rejected later, based on the image result. If the candidate filter group will not be set automatically, then operation proceeds to step S1320. Otherwise, operation jumps to step S1330. The determination to automatically select the candidate filter group can be made and/or communicated using a candidate filter method option of a graphical user interface.

In step S1320, the user manually selects a candidate filter group as previously discussed above. Operation then jumps to step S1340. In contrast, in step 1330, the candidate filter group to be used is automatically determined. Then, operation proceeds to step S1340.

In step S1340, the candidate filters selected or automatically determined through the candidate filter method are applied to the defined area-of-interest of the input image to generate a corresponding number of feature images. Then, in step S1350, operation returns to step S1400.

Figure 10:
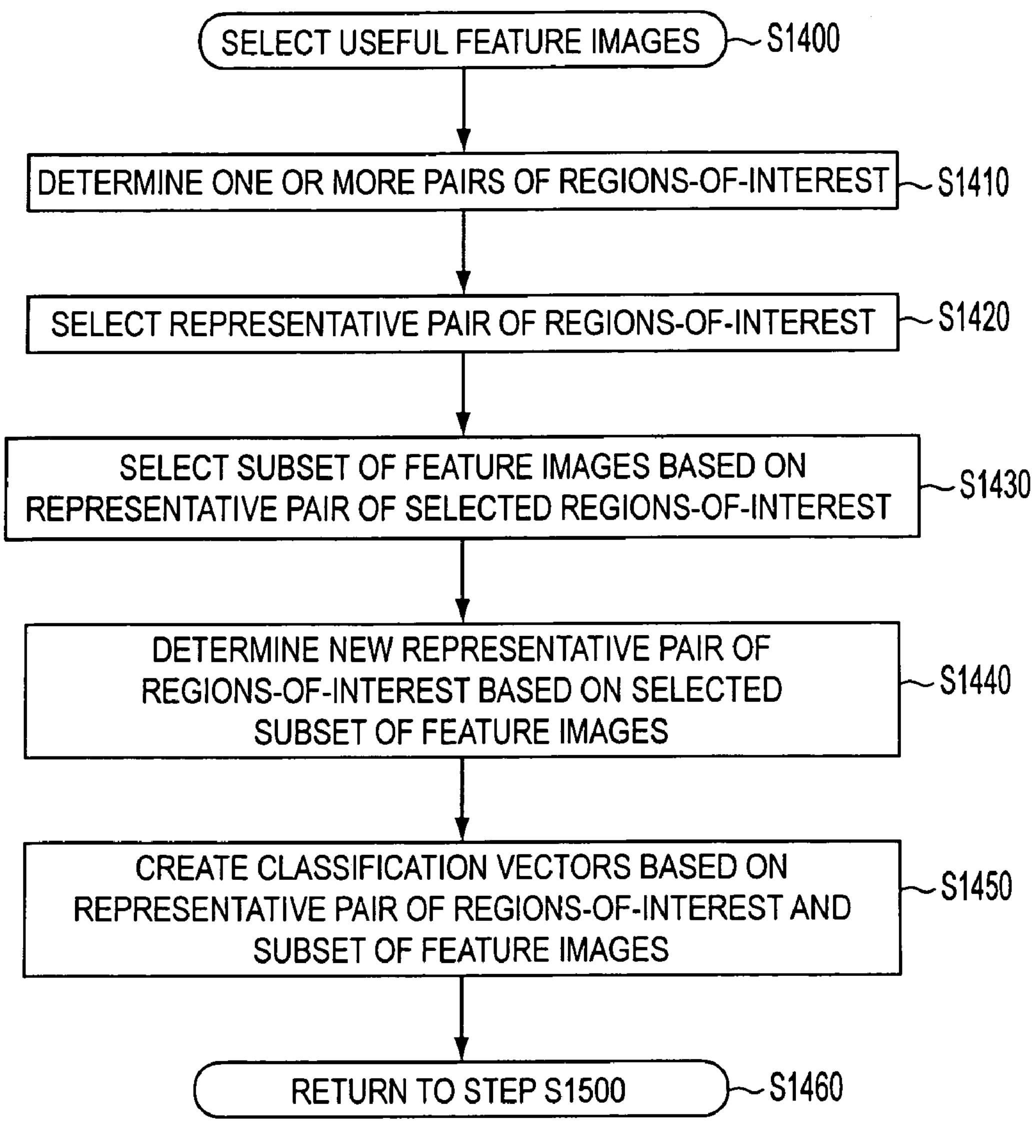
FIG. 10 is a flowchart outlining in greater detail one exemplary embodiment of the method for performing feature selection of FIG. 7 according to this invention.

FIG. 10 is a flowchart outlining in greater detail one exemplary embodiment of the method for performing the useful feature image selection of step S1400. As previously discussed, when a useful feature image is selected a corresponding filter used in generating the feature image is also effectively selected. Beginning in step S1400, operation proceeds to step S1410, where a single pair of regions-of-interest, or one or more pairs of regions-of-interest, such as the various pairs of regions-of-interest shown in FIGS. 3, 4 and 6, are defined. In particular, for each pair of regions-of-interest, a first region of interest is defined on one side of the point of interest P0 within the area of interest bounded by the boundary detection tool. The second region of interest of that pair of regions-of-interest is defined diametrically on the other side of the point of interest P0 from the first region of interest of that pair of regions-of-interest. Then, in step S1420, a representative pair of regions-of-interest $RROI_1$ and $RROI_2$ is selected from the one of the one or more pairs of regions-of-interest. Of course, it should be appreciated that step S1420 can be omitted if only a single pair of regions-of-interest is defined in step S1410.

Next, in step S1430, a subset of the feature images, which generally includes the feature images that best distinguish between the image data within the representative pair of regions-of-interest that are on opposite sides of the selected point P0, is selected based on an analysis of the feature image data within the representative pair of regions-of-interest. The corresponding set of selected filters is at least temporarily stored as tool-related data. As outlined above, in various exemplary embodiments, this selection is done to reduce the number of filters that need to be applied for edge detection, in order achieve faster edge detection and/or to improve the accuracy and reliability of detecting the edge using the systems and methods according to this invention. Operation then continues to step S1440.

The step S1430 constitutes a feature selection step. It should be appreciated that feature extraction is a well-known alternative or supplement to feature selection. Feature extraction is a technique that, in effect, combines the feature images to generate a smaller but more effective set of feature images. Various usable feature extraction methods will be apparent to one skilled in the art and in various exemplary embodiments, feature extraction is performed in the step S1430, instead of feature selection. Usable feature extraction methods are explained in the previously cited references.

In step S1440, the representative pair of regions-of-interest, is re-selected to provide a later $RROI_1$ and $RROI_2$ based on the selected subset of feature images. It should be appreciated that step S1440 is optional, and thus can be omitted. Next, in step S1450, a number of classification vectors, such as, for example, the classification vectors CV1 and CV2 discussed above are created based on the image data in the latest representative pair of regions-of-interest $RROI_1$ and $RROI_2$ of each of the feature images of the subset of feature images. In one exemplary embodiments, the mean image data in each of the feature images of the subset of feature images that lies within the representative regions-of-interest $RROI_1$ and $RROI_2$ are calculated to generate the classification vectors CV1 and CV2, respectively. In general, the dimension of the classification vectors CV1 and CV2 is n, wherein n is the number of feature images in the subset of feature images. Optionally, the latest RROI1 and RROI2 are in various exemplary embodiments, stored at least temporarily as tool-related data. Then, in step S1460, operation returns to step S1500.

Figure 11:
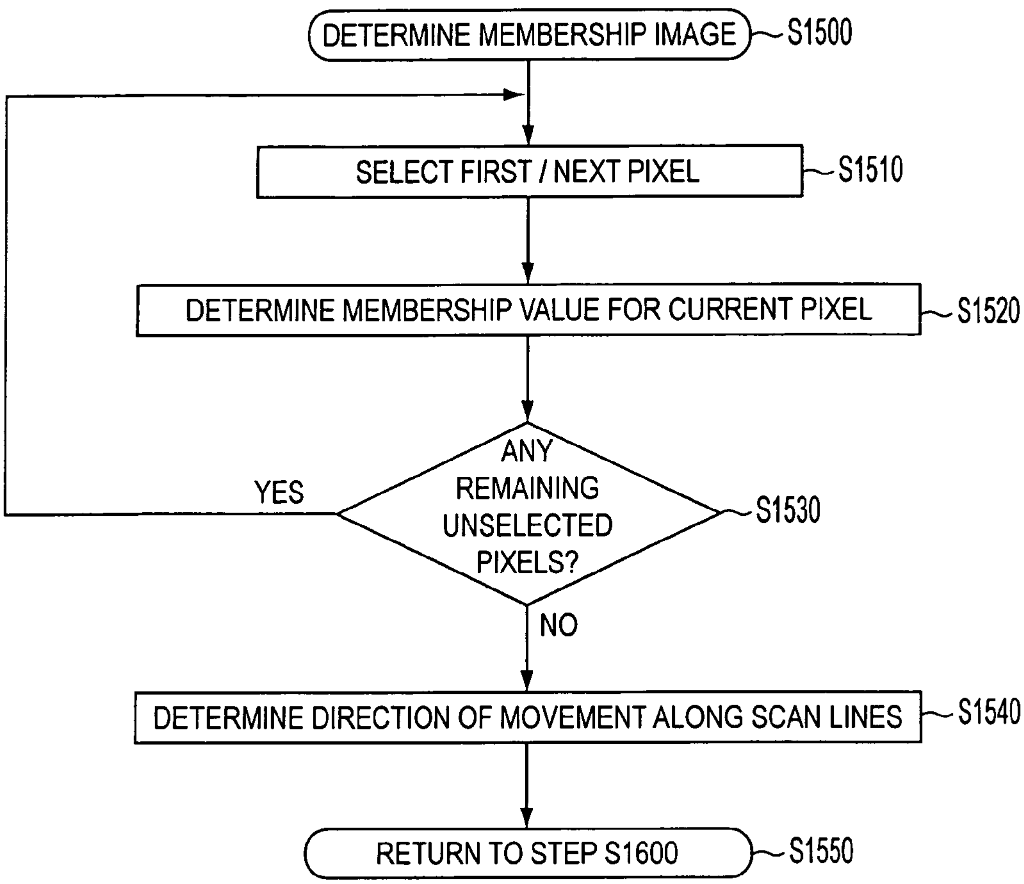
FIG. 11 is a flowchart outlining an exemplary embodiment of a method for determining a pseudo-image of FIG. 7 according to this invention.

FIG. 11 is a flowchart outlining in greater detail one exemplary embodiment of the method for determining the membership-image of step S1500. Beginning in step S1500, operation proceeds to step S1510, where a first or next pixel, that is, a pixel location, within at least the area of interest bounded by the boundary detection tool is selected. Next, in step S1520, a membership value for the current pixel is determined using a classifier such as the previously described modified fuzzy c-means classifier and the created classification vectors CV1 and CV2. Then, operation proceeds to step S1530.

It should be appreciated that the modified fuzzy c-means classifier is just one exemplary classifier usable in the operations performed in the step S1520 that is particularly fast and suitable when the operations of the steps S1420–S1450 shown in FIG. 10 have been performed. In various exemplary embodiments of the systems and method according to this invention, an "un-modified" fuzzy c-means classifier described in the previously cited reference is used. Such a classifier does not require prototypes of the clusters and works iteratively to improve the classification of the data points. Thus, there is no need to perform the operations of at least the steps S1420–S1450 shown in FIG. 10.

Next, in step S1530, a determination is made whether any remaining unselected pixels need to be analyzed. If so, then operation proceeds back to step S1510. Otherwise, operation proceeds to step S1540, where the direction of traversing along the scan lines to perform edge detection is determined. As previously discussed, the direction of movement along the scan lines can be determined using the membership image and the representative pair of regions-of-interest $RROI_1$, and $RROI_2$ used in determining the membership image. Then, in step S1550, operation returns to step S1600.

It should be appreciated that the operations of the step S1540 can alternatively be omitted in the step S1500 and performed at the beginning of step S1600 instead. In yet other exemplary embodiments, the operations of the step 1540 are omitted entirely and a default traversing direction is used. Although the reliability and accuracy may be somewhat affected for some edges, significant benefits will be retained in such embodiments of the systems and methods according to this invention.

Figure 12:
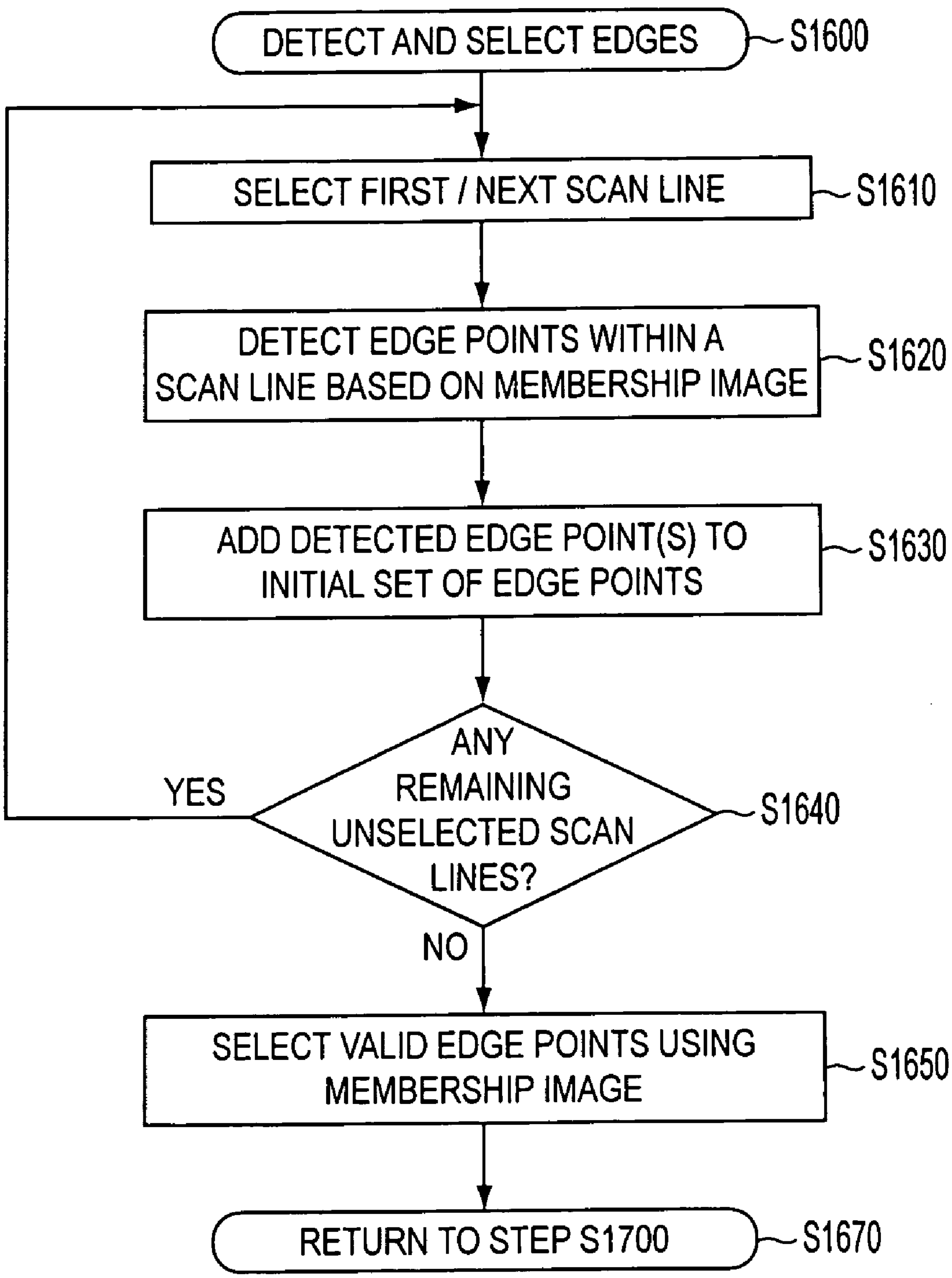
FIG. 12 is a flowchart outlining an exemplary embodiment of a method for detecting and selecting edge point locations of FIG. 7 according to this invention.

FIG. 12 is a flowchart outlining in greater detail one exemplary embodiment of the method for detecting and selecting edge point locations of step S1600. Beginning in step S1600, operation proceeds to step S1610, where a first or next scan line is selected. Then, in step S1620, one (or more) edge points within the selected scan line is detected using the membership-image defined in step S1500. It should be appreciated that the pixel values of the original membership-image could be scaled, or normalized to an expected range if this is more advantageous or robust for the edge detection operation selected for use in the systems and methods according to this invention. Next, in step S1630, the detected edge points are added to an initial set of edge points PEI. Operation then continues to step S1640.

In step S1640, a determination is made whether there are any remaining unselected scan lines. If so, operation proceeds back to step S1610. Otherwise, operation proceeds to step S1650. In step S1650, valid edge points are selected based on the membership-image. Then, in step S1670, operation returns to step S1700.

Figure 13:
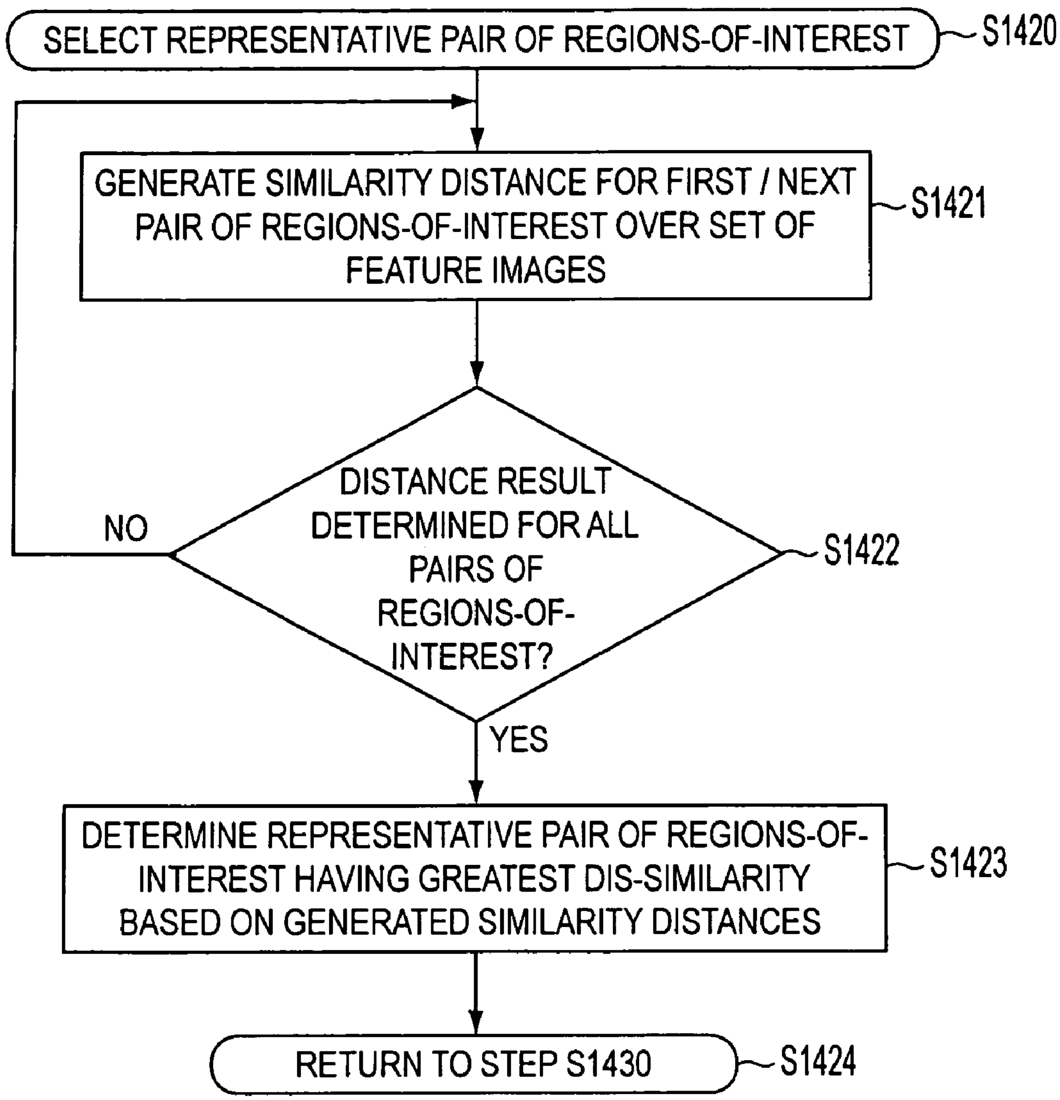
FIG. 13 is a flowchart outlining in greater detail one exemplary embodiment of the method for selecting a representative pair of regions-of-interest of FIG. 10 according to this invention.

FIG. 13 is a flowchart outlining in greater detail one exemplary embodiment of the method for selecting a representative pair of regions-of-interest of the step S1420. Beginning in step S1420, operation continues to step S1421, where, for a first/next pair of regions-of-interest, a similarity distance between the feature images data in the two regions-of-interest is determined based on each feature image of the candidate set of feature images. The similarity distance is, in various exemplary embodiments, the Fisher distance, which is discussed above. It should also be appreciated that several similarity distances could be determined. Then, in step S1422, a determination is made whether the similarity distance has been determined for all of the pairs of regions-of-interest that have been defined. If so, operation continues to step S1423. Otherwise, operation jumps to step S1421 where similarity distance results are determined for the next pair of regions-of-interest.

In step S1423, a representative pair of regions-of-interest, $RROI_1$ and $RROI_2$, is selected based on the determined similarity distances, as previously described. In general, the selected representative pair is that pair having the most dis-similar constituent regions-of-interest, based on the determined similarity distances. Operation then continues to step S1424. It should be appreciate that in a case where only a single pair of regions-of-interest has been defined, it is selected as the representative pair of regions-of-interest. Then, in step S1424, operation returns to step S1430.

Figure 14:
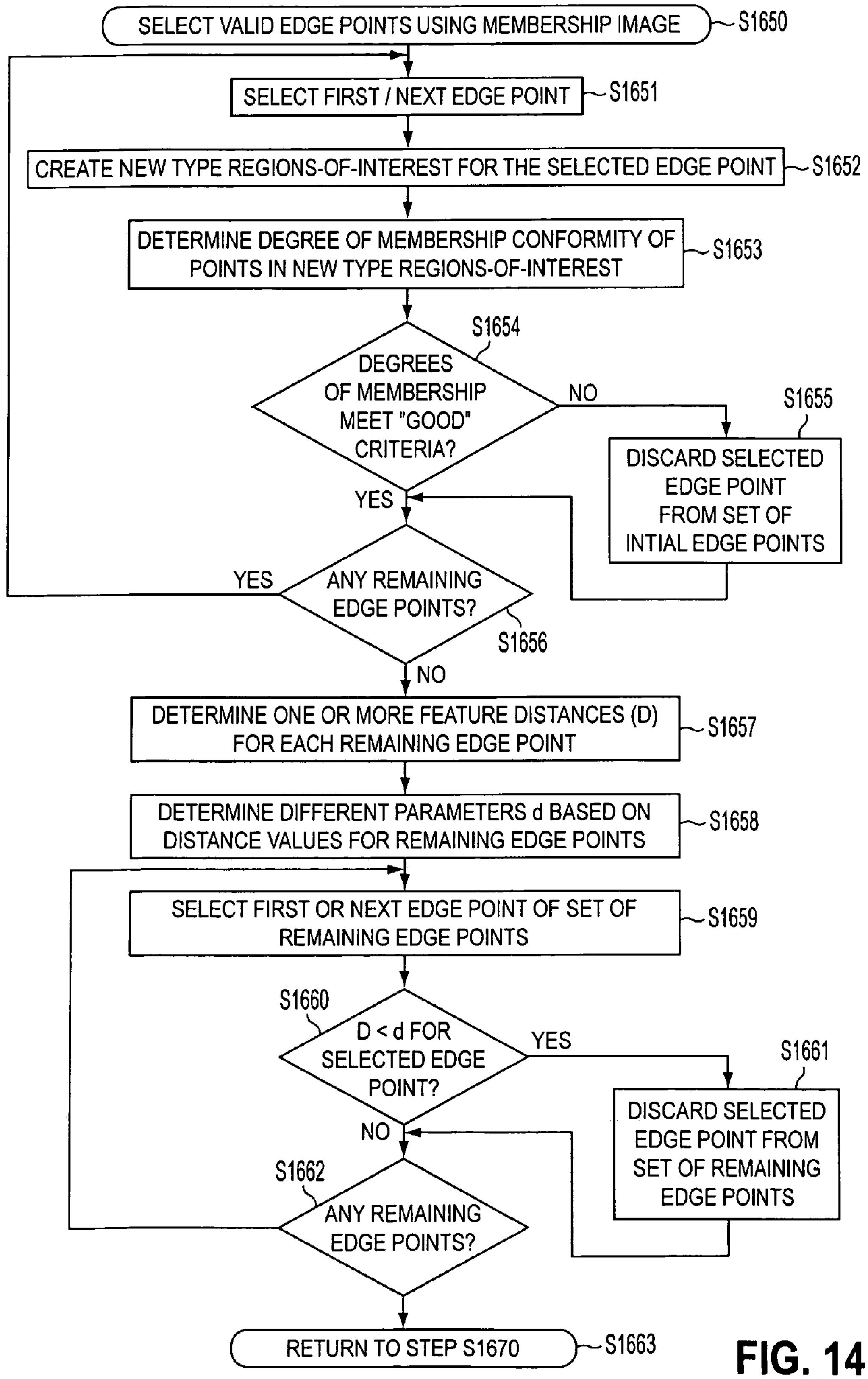
FIG. 14 is a flowchart outlining an exemplary embodiment of a method for selecting valid edge point locations of FIG. 12 according to this invention.

FIG. 14 is a flowchart outlining one exemplary embodiment of a method for selecting valid edge points using the membership-image of FIG. 12 according to this invention. Beginning in step S1650, operation proceeds to step S1651 where a first or next edge point is selected. Then, in step S1652, a new type of a pair of regions of interest EROI1 and EROI2, generally unrelated in function and position to the previously defined regions-of-interest, is defined for the selected edge point. In one exemplary embodiment, EROI1 and EROI2 are 11-by-11 pixel squares, centered on the scan line corresponding to the selected edge point, and centered 10 pixels away from the selected edge point, on respective opposite sides. Operation then continues to step S1653.

In step S1653, a determination is made of the degree of conformity of the membership image pixel values in the new pair of regions of interest EROI1 and EROI2. Operation then continues to step S1654.

It should be appreciated that the membership image pixels have a range of possible values between a first value representing perfect membership in the class corresponding to RROI1, and a second value representing perfect membership in the class corresponding to RROI2. The pixels in each respective new region of interest, EROI1 and EROI2, should generally conform to their respective sides of the membership image boundary. In one exemplary embodiment, if a pixel value lies closer to the first value, it conforms to the class of RROI1 and if it lies closer to the second value, it conforms to the class of RROI2. In another exemplary embodiment, the membership image pixel values are compared to a threshold determined during a learn mode based on one or more determined edge point's membership values for evaluating membership conformity.

In step SI 654, a determination is made whether the degree of membership conformity meets a predefined "good" criteria. That is, in step S1654, the edge points in the initial set of edge points PEI are analyzed to determine whether a detected edge point should be discarded from the initial set of edge points as being an invalid edge point. The detected edge point is not discarded, for example, if a predetermined proportion of the pixels in EROI1 conform to the criterion representing their side of the boundary (such as CV1, a property of RROI1, or the like) and a predetermined proportion of the pixels in EROI2 conform to the criterion representing their side of the boundary. If the "good" criteria is met, then operation jumps to step S1656. Otherwise, operation proceeds to step S1655, where the selected edge point is discarded from the set of initial edge points. Operation then proceeds to step S1656. In one exemplary embodiment, the proportion of pixel conforming in each region EROI1 and EROI2 must be at least 85%, otherwise the selected edge point is discarded. It should be appreciated that low conformity corresponds to a noisy or anomalous region, which tends to indicate an invalid edge point. The predetermined proportion may be adjusted depending on the reliability desired for the "accepted" edge points. Furthermore, it should be appreciated that different types of criteria for distinguishing one side of the boundary from the other may be used as the conformity criteria during run mode operations and training mode operations, respectively, depending on the data conveniently available in each of the two modes.

In step S1656, a determination is made whether there are any remaining edge points to be analyzed. If so, the operation returns to step S1651. Otherwise, operation proceeds to step S1657.

In step S1657, one or more feature distance values D are determined corresponding to each remaining edge point that was not discarded in step S1655. In one exemplary embodiment, the Fisher distance between the previously described EROI1 and EROI2 corresponding to each remaining edge point is determined, based on all features images in the selected subset of feature images. In this case, a single distance value D results for each remaining edge point. Next, in step S1658, one or more corresponding difference parameters d are determined based on the one or more determined distance values D for the remaining edge points. The difference parameter(s) d may be at least temporarily stored as tool-related data. For example, the minimum of the Fisher distance values D, just described, may be determined as a single difference parameter d. Operation then continues to step S1659.

In step S1659, a first or next edge point is selected from the remaining edge points PE of the set of initial edge points PEI. Operation then continues to step S1660.

In step S1660, a determination is made whether the one or more feature distances (D) for the selected edge point determined in step S1657 is less than the corresponding one or more difference parameters (d) determined in step S1658. If the one or more feature distances (D) for the selected edge point are not less than the corresponding one or more difference parameters (d), then operation jumps to step S1662. Otherwise, operation proceeds to step S1661, where the selected edge point is discarded from the set of remaining edge points PE. Operation then continues to step S1662. In step S1662, a determination is made whether there are any remaining edge points to be validated. If so, then operation returns to step S1659. Otherwise, operation goes to step S1663, where operation returns to step S1670.

It should be appreciated that the difference parameters d determined by the operations of the step S1657 can be saved and used in association with the associated trained edge tool during the run mode, in a manner similar to the applicable operations described with reference to the steps S1657–S1662. The effect is to tend to insure that the membership image created at run time is at least approximately as suitable for edge-detection as the membership image used for training. It should be further appreciated that if d is set to the minimum value previously described, the steps S1659–S1662 need not be performed in a tool training mode. It should be further appreciated that the sets of operations approximately corresponding to the steps S1651–S1656, and the steps S1657–S1662, respectively, both tend to insure the reliability of the remaining edge points, Thus, the screening method used in either set of operations can generally also be implemented alone. Although the reliability and accuracy may be somewhat affected for some edges, significant benefits will be retained in such embodiments of the systems and methods according to this invention.

Figure 15:
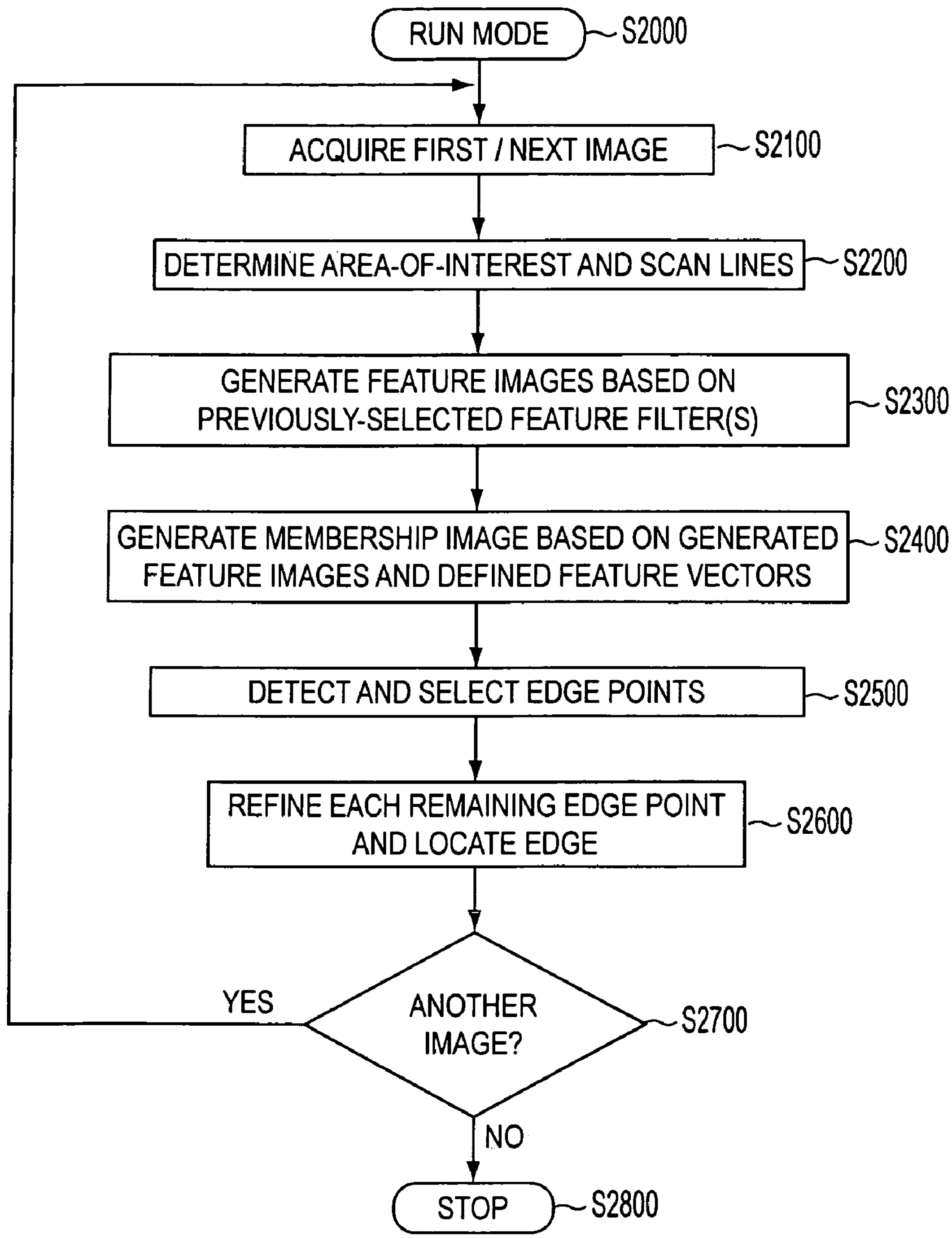
FIG. 15 is a flowchart outlining one exemplary embodiment of a method for using a tool defined according to the method outlined in FIGS. 7–14 to identify edges in a second image according to this invention.

FIG. 15 is a flowchart outlining one exemplary embodiment of a method for detecting the location of a similar specific case of an edge in a different but similar specific case of an input image using the parameters defined according to the setup method outlined in FIGS. 7–14 according to this invention. As previously discussed, the edge detection systems and methods, and more specifically, the boundary detection tool, have been set up by the operation previously discussed to detect specific edges within a specific input image using specific image-derived parameters. Accordingly, the edge detection systems and methods of this invention can now be used in an automated mode to locate edges or boundaries in a different but similar case of that input image during a run mode. Because the operation of the run mode according to the edge detection systems and methods of this invention encompasses many of the same steps as previously discussed in the set-up mode, a detailed description of steps S2100–S2400 and S2600–S2700 will be omitted because these steps are similar to the corresponding steps in FIGS. 7–12 but some parameters previously determined and accepted/stored during "learn" mode, are used at "run mode."

Beginning in step S2000, operation proceeds to step S2100, where a first or next image is acquired. Then, in step S2200, the area of interest and the one or more scan lines are determined using the parameters determined at "learn mode". Next, in step S2300, one or more feature images are generated based on the previously selected filters stored as tool-related data. Then, in step S2400, the membership-image is generated based on the set of feature images generated in the operations of the step 2300, and the previously-discussed classification vectors CV1 and CV2. Operation then proceeds to step S2500.

It should be appreciated that in various other exemplary embodiments, the membership image may be generated based on various different combinations of retained tool-related data, and currently generated data. For example, in a first embodiment, the classification vectors CV1 and CV2 are the vectors determined during the training or learn mode, and the membership image pixel values are determined accordingly. In a second embodiment, current classification vectors CV1 and CV2 are determined from the current set of feature images, using a pair of RROI's based on an RROI definition determined during the training or learn mode. In a third embodiment, current RROI1 and RROI2 are determined using the operations of the steps 1410–1420, current CV1 and CV2 are determined using the operations of the step 1450, and the membership image pixel values are determined accordingly. It should be appreciated that the second and third embodiments will be somewhat more time consuming than the first embodiment, but all three embodiments derive the benefits associated with using the previously selected filters stored as tool-related data. Various other combinations and alternative will be apparent to one skilled in the art.

In step S2500, one or more edge points are detected in each scan line and the "good" edge points are selected. Because this operation is different from the edge point detection and selection process described with respect to step S1600 of FIGS. 7, 12 and 14, a more detailed description of this operation will be described with reference to FIG. 16. Next, in step S2600, the location of the edge to be detected along each scan line having a remaining edge point that has not been discarded in step S2500 is refined and the edge location is finally determined, all as previously described with reference to step S1700 of FIG. 7. Then, in step S2700, a determination is made whether another input image is to be acquired. If so, then operation jumps back to step S2100. Otherwise, operation proceeds to step S2800, where the operation of the run mode method ends.

Figure 16:
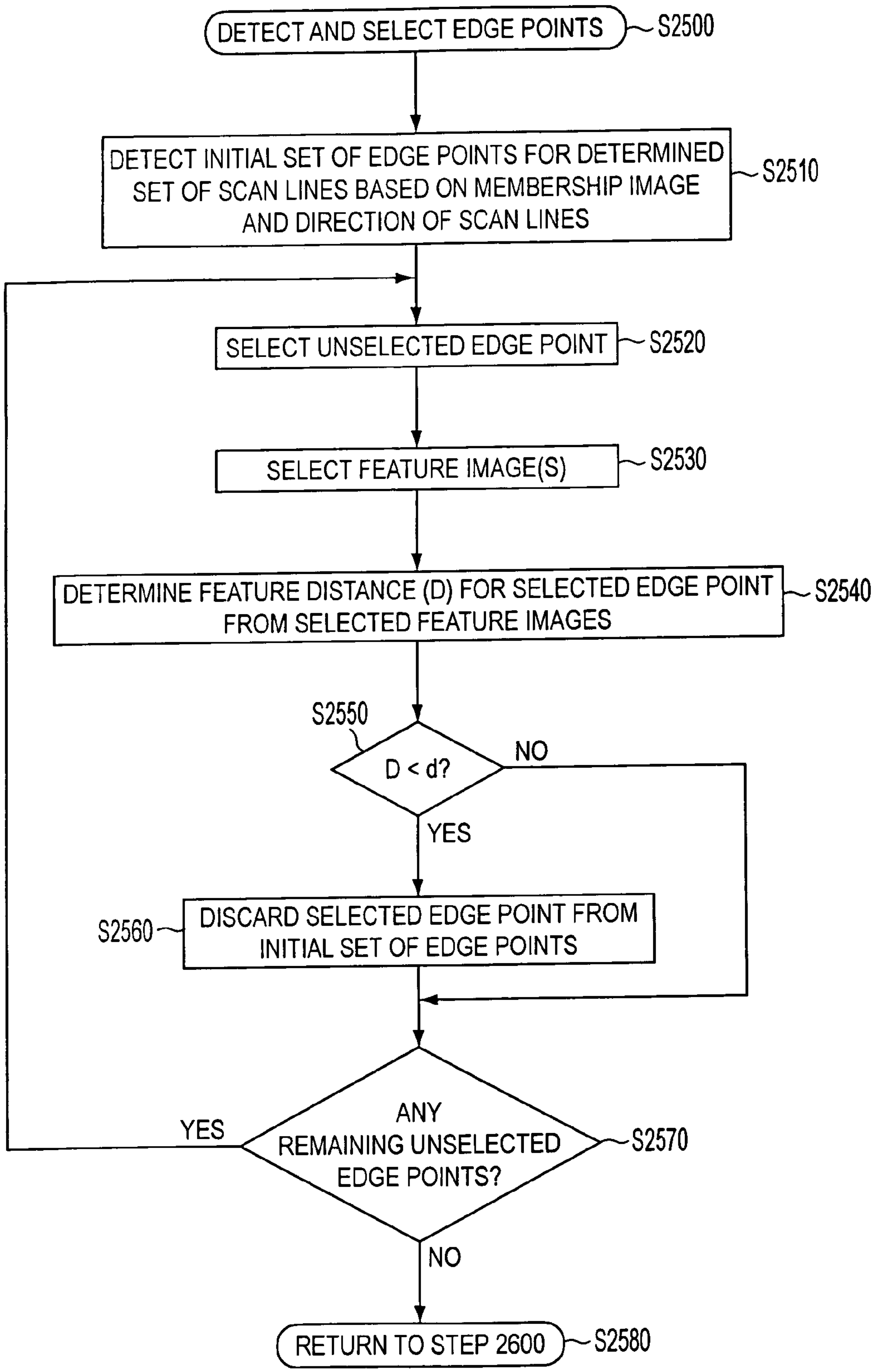
FIG. 16 is a flowchart outlining in greater detail one exemplary embodiment of the method for selecting valid edge point locations of FIG. 14 according to this invention.

FIG. 16 is a flowchart outlining in greater detail one exemplary embodiment of the method for selecting edge point locations of FIG. 15 according to this invention. Beginning in step S2500, operation proceeds to step S2510, where an initial set of edge points for the determined set of scan lines is detected. This set of edge points is based on the membership-image generated in step S2400. Next, in step S2520, an unselected edge point is selected. Then, in step S2530, the feature distance (D) for the selected edge point is determined from that edge point, as previously described with reference to step S1657 of FIG. 14. Then, operation proceeds to step S2540.

In step S2540, a determination is made whether the one or more feature distances D for the selected edge point are less than the corresponding one or more difference values d previously defined in step S1658 in FIG. 14. If so, operation proceeds to step S2550. Otherwise, operation jumps to step S2560. In step S2550, because the one or more feature distances D for the selected edge point are less than the corresponding one or more difference values d, the selected edge point is discarded from the initial set of edge points. Then, in step S2560, a determination is made whether there are any remaining unselected edge points. If so, then operation returns to step S2520. Otherwise, operation proceeds to step S2570, where operation returns to step S2600. It should be appreciated that in various exemplary embodiments, the operations described with reference to the steps S1651–S1656 are performed prior to performing the step S2570 in run mode, to further increase the reliability of the remaining edge points. For example, the operations may be performed just after the step 2560, or just after the step 2510.

The control portion 100 in various exemplary embodiments, is implemented on a programmed general purpose computer. However, the control portion 100 in accordance with this invention can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 7–15, can be used to implement control portion 100 in accordance with this invention.

The memory 130 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

It should be understood that each of the circuits or other elements 150–180 and 305–379 shown in FIG. 1 can be implemented as portions of a suitably programmed general purpose computer. Alternatively, each of the circuits or other elements 150–180 and 305–379 shown in FIGS. 1 can be implemented as physically distinct hardware circuits within an ASIC, or using a FPGA, a PDL, a PLA or a PAL, or using discrete logic elements or discrete circuit elements. The particular form each of the circuits or other elements 150–180 and 305–379 shown in FIG. 1 will take is a design choice and will be obvious and predicable to those skilled in the art.

Moreover, the control portion 100 can be implemented as software executing on a programmed general purpose computer, a special purpose computer, a microprocessor or the like. The control portion 100 can also be implemented by physically incorporating it into a software and/or hardware system, such as the hardware and software systems of a vision system.

While the invention has been described with reference to what are preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A method for generating a case-specific boundary locating routine for determining a boundary location on an image of an object that is imaged by a machine vision system having at least two image filtering elements, the method comprising:

identifying an area of interest on the image of the object that is imaged by the machine vision system, the area of interest indicative of the boundary to be located on the object;

determining at least two filtered image results in the vicinity of the area of interest, the at least two filtered image results based at least partially on at least one of the at least two image filtering elements;

selecting at least one of the at least two image filtering elements based on the at least two filtered image results;

determining the case-specific boundary locating routine, wherein the case-specific boundary locating routine comprises:

generating a pseudo-image that includes a boundary corresponding to a boundary to be located on the object, based on the at least one selected image filtering element; and performing an edge detection operation on the pseudo-image to determine the boundary location.

2. The method of claim 1, wherein performing the edge detection operation on the pseudo-image further comprises determining at least one edge point indicative of the boundary location and determining the boundary location based on the at least one determined edge point.

3. The method of claim 2, wherein the determining the at least one edge point further comprises determining at least one edge point based on a gradient analysis operation along a respective scan line that extends across the boundary location.

4. The method of claim 2, wherein the determining the at least one edge point further comprises:

determining a first edge point based on a first analysis operation along a respective scan line extending across the boundary location;

performing a second analysis operation on data associated with a plurality of pixel locations i that extend along the respective scan line in a local region that extends on both sides of the first edge point; and determining a modified edge point to replace the first edge point based on the results of the second analysis operation.

5. The method of claim 4, wherein the second analysis operation comprises determining a value for each of the plurality of pixel locations i based on the data associated with the plurality of pixel locations and determining a centroid location along the respective scan line, based on a spatial distribution of the determined values.

6. The method of claim 5, wherein the value determined for each of the plurality of pixel locations i comprises a feature distance between the data associated with an (i+1) pixel location and the data associated with an (i−1) pixel location in at least one feature image corresponding to the at least one selected image filtering element.

7. The method of claim 2, wherein the determining the boundary location further comprises:

analyzing a set of determined edge points according to criteria comprising at least one of a local region conformity criterion, a local region feature-distance criterion, and a boundary shape criterion;

eliminating determined edge points which fail to meet the criteria, to determine a remaining set of determined edge points; and determining the boundary location based on the remaining set of determined edge points.

8. The method of claim 7, wherein determining the remaining set of determined edge points further comprises eliminating determined edge points which are determined to be outliers relative to a straight or curved line fit to the determined set of edge points.

9. The method of claim 7, wherein determining the remaining set of determined edge points comprises eliminating determined edge points which are flanked by first and second local regions on opposite sides of the boundary which do not conform to representative characteristics established for the first and second sides of the boundary.

10. The method of claim 7, wherein determining the remaining set of determined edge points comprises;

determining a feature distance between first and second local regions flanking a determined edge point on opposite sides of the boundary, the feature distance based on at least one feature image corresponding to the at least one selected image filtering element; and eliminating the determined edge point if the feature distance is less than a representative feature distance previously established based on similar first and second local regions.

11. The method of claim 1, wherein the determining the .at least two filtered image results further comprises:

determining a first partial filtered image result for a first region in the vicinity of the area of interest on a first side of the boundary;

determining a second partial filtered image result for a second region in the vicinity of the area of interest on a second side of the boundary; and determining a filtered image result based on a difference between the determined first partial filtered image result and the determined second partial filtered image result.

12. The method of claim 11, the determining the first and second partial filtered image results further comprising:

generating a filtered image in the vicinity of the area of interest based at least partially on at least one respective image filtering element; and determining the first partial filtered image result and the second partial filtered image result based on that generated filtered image.

13. The method of claim 11, wherein the selecting the at least one of the two image filtering elements further comprises;

determining a filtered image result which exhibits a greatest difference between its respective first partial filtered image result and its second partial filtered image result; and selecting the at least one of the two image filtering elements based on the determined filtered image result.

14. The method of claim 11, wherein the first and second regions are selected from a plurality of first and second region candidates.

15. The method of claim 14, wherein the first and second regions are selected based on first and second regions which produce a maximum difference between their respective first and second partial filtered image results, in comparison to a difference between respective first and second partial filtered image results produced by a remainder of the plurality of first and second region candidates.

16. The method of claim 1, further comprising determining a similar-case boundary location using the case-specific boundary locating routine.

17. The method of claim 1, wherein the machine vision system further comprises a part-program recording portion, and the method further comprises recording the case-specific boundary locating routine within a part program.

18. The method of claim 1, further comprising repeating the method for at least a second area of interest to determine at least a second case-specific boundary locating routine for determining at least a second case-specific boundary location on the image of the object imaged by the machine vision system.

19. The method of claim 1, the machine vision system further comprising predetermined groups of the at least two image filtering elements, each predetermined group corresponding to texture characteristics surrounding a boundary location indicated by the area of interest, wherein the determining the at least two filtered image results in the vicinity of the area of interest further comprises:

determining the texture characteristics in regions on both sides of the boundary location;

selecting a predetermined groups of the at least two image filtering elements based on the determined texture characteristics; and determining the at least two filtered image results such that each of the at least two filtered image results is based only on filtering elements that are included in that selected predetermined groups of the at least two image filtering elements.

20. The method of claim 1, wherein the pseudo-image comprises a membership image.

21. The method of claim 1, wherein the determining the case-specific boundary locating routine comprises:

generating a current pseudo-image based on the selected at least one of the at least two image filtering elements; and determining at least one case-specific edge detection parameter value based on the generated current pseudo-image, wherein:

the case-specific boundary locating routine further comprises the at least one case-specific edge detection parameter value, and the edge detection operation compares a characteristic of the pseudo-image generated by the case-specific boundary locating routine to the at least one case-specific edge detection parameter value to produce a reliable edge point.

22. The method of claim 1, wherein the machine vision system further comprises an image display, a user input device, a graphical user interface and at least one edge tool, and the identifying the area of interest further comprises a user of the machine vision system indicating the area of interest by positioning the at least one edge tool relative to a boundary location on an image of an object displayed on the image display.

23. The method of claim 1, wherein at least the determining the at least two filtered image results, the selecting the at least one of the at least two image filtering elements, and the determining the case-specific boundary locating routine are performed automatically by the machine vision system.

24. The method of claim 1, wherein the at least two image filtering elements comprise texture filtering elements.

25. The method of claim 24, wherein the machine vision system comprises a color camera and the at least two image filtering elements further comprise color filtering elements.

26. A method for operating a machine vision system to determine a boundary location on an object that is imaged by the machine vision system having at least two image texture filtering elements, the method comprising:

identifying an area of interest on the object that is imaged by the machine vision system, the area of interest indicative of the boundary on the object;

generating a pseudo-image that includes the boundary corresponding to a boundary be located on the object based on at least one image texture filtering element pre-selected based on an analysis of a previous similar-case boundary; and performing an edge detection operation on the pseudo-image to determine the boundary location.

27. The method of claim 26, wherein performing the edge detection operation on the pseudo-image further comprises determining at least one edge point indicative of the boundary location and determining the boundary location based on the at least one determined edge points.

28. The method of claim 27, wherein the determining the at least one edge point further comprises:

determining a first edge point based on a first analysis operation along a respective scan line extending across the boundary location;

performing a second analysis operation on data associated with a plurality of pixel locations that extend along the respective scan line in a local region that extends on both sides of the first edge point; and determining a modified edge point to replace the first edge point based on the results of the second analysis operation.

29. The method of claim 28, wherein the second analysis operation comprises determining a value for each of the plurality of pixel locations i based on the data associated with the plurality of pixel locations and determining a centroid location along the respective scan line, based on a spatial distribution of the determined values.

30. The method of claim 29, wherein the value determined for each of the plurality of pixel locations i comprises a feature distance between the data associated with an (i+1) pixel location and the data associated with an (i−1) pixel location in at least one feature image corresponding to the at least one selected image filtering element.

31. The method of claim 27, wherein the determining the boundary location further comprises:

analyzing a set of determined edge points according to criteria comprising at least one of a local region conformity criterion, a local region feature-distance criterion, and a boundary shape criterion;

eliminating determined edge points which fail to meet the criteria, to determine a remaining set of edge points; and determining the boundary location based on the remaining set of edge points.

32. The method of claim 26, wherein the boundary location is determined with a resolution of better than 100 microns on the object imaged by the machine vision system.

33. The method of claim 26, wherein the boundary location is determined with a resolution of better than 25 microns on the object imaged by the machine vision system.

34. The method of claim 26, wherein the boundary location is determined with a resolution of better than 5 microns on the object imaged by the machine vision system.

35. The method of claim 26, wherein the boundary location is determined with a sub-pixel resolution relative to the image of the object imaged by the machine vision.

36. A method for operating a machine vision system, the machine vision system comprising:

a set of image texture filtering elements;

a first mode of edge detection that determines a location of an edge using characteristics other than texture around the edge on an image of an object imaged by the machine vision system;

a second mode of edge detection that determines a location of an edge using the texture around the edge on an image of the object imaged by the machine vision system by using the set of image texture filtering elements;

an image display;

a user input device;

a graphical user interface; and a set of at least one edge tool;

the method comprising:

acquiring the image of the object including an edge whose location is to be determined;

displaying the acquired image of the object on the image display;

selecting the at least one edge tool;

identifying an area of interest in the displayed image by positioning the at least one edge tool relative to the edge whose location is to be determined;

selecting at least one of the first and second modes of edge detection; and determining a case-specific edge locating routine based on the selected at least one of the first and second modes of edge detection, the case-specific edge locating routine used to determine a boundary location.

37. The method of claim 36, wherein the at least one edge tool is selectable by a user of the of the machine vision system and is usable with the selected at least one of the first and second modes of edge detection without consideration of the selected at least one of the edge detection modes by the user.

38. The method of claim 37, wherein the selecting the at least one of the first and second modes of edge detection comprises:

automatically determining at least one texture characteristic in regions on both sides of an edge in the area of interest; and automatically selecting the at least one of the first and second modes of edge detection based on the determined at least one texture characteristic.

39. The method of claim 36, wherein when the second mode of edge detection is selected, the case-specific boundary locating routine comprises:

generating a pseudo-image that includes the boundary location, the pseudo image based on the image texture filtering elements selected according to the second mode of edge detection; and performing an edge detection operation on the pseudo-image of the boundary location to determine a boundary location that is useable as a dimensional inspection measurement for the object imaged by the machine vision system.

40. A case-specific boundary locating system for determining a boundary location on an image of an object that is imaged by a machine vision system having at least two image filtering elements, the system comprising:

a filtered image analyzing section that applies the at least two filtering elements to a textured input image in an area of interest to determine modified data, and that determines filtered image results based on the modified data;

a case-specific filter selection section that selects at least one of the at least two filtering elements that best emphasize the boundary location in the area of interest based on the filtered image results;

a pseudo-image generating section that generates a pseudo-image in the area of interest based on the selected at least one of the at least two filtering elements;

an edge point analyzing section that is applied to the pseudo-image in the area of interest to estimate one or more edge points in the pseudo-image; and a boundary locating and refining section that analyzes the one or more estimated edge points to determine if they correspond to criteria for a reliable edge.

41. A case-specific edge locating system having a case-specific edge locating routine for determining a location of an edge on an image of an object that is imaged by a machine vision system, the system comprising:

a set of image texture filtering elements;

a first mode of edge detection that determines the location of the edge using characteristics other than texture around the edge on the image of the object imaged by the machine vision system;

a second mode of edge detection that determines the location of the edge using the texture around the edge on the image of the object imaged by the machine vision system by using the set of image texture filtering elements;

a graphical user interface;

an image display that displays an acquired image of the object on the image display; and a user input device that selects at least one edge tool;

wherein:

an area of interest is identified in the displayed acquired image by positioning the at least one edge tool relative to the edge whose location is to be determined, at least one of the first and second modes of edge detection is selected, and the case-specific edge locating routine is determined based on the selected at least one of the first and second modes of edge detection.

* * * * *